United States Patent
Woo et al.

(10) Patent No.: US 12,442,858 B2
(45) Date of Patent: Oct. 14, 2025

(54) SEMICONDUCTOR INTEGRATED CIRCUIT, A METHOD FOR TESTING THE SEMICONDUCTOR INTEGRATED CIRCUIT, AND A SEMICONDUCTOR SYSTEM

(71) Applicant: SAMSUNG ELECTRONICS CO., LTD., Suwon-si (KR)

(72) Inventors: Hyungil Woo, Hwaseong-si (KR); Sungcheol Park, Seoul (KR); Jehyun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 341 days.

(21) Appl. No.: 17/849,945

(22) Filed: Jun. 27, 2022

(65) Prior Publication Data

US 2023/0096746 A1   Mar. 30, 2023

(30) Foreign Application Priority Data

Sep. 28, 2021 (KR) .......... 10-2021-0128350
Dec. 14, 2021 (KR) .......... 10-2021-0178879

(51) Int. Cl.
*G01R 31/317* (2006.01)
*G01R 31/3185* (2006.01)

(52) U.S. Cl.
CPC . *G01R 31/31719* (2013.01); *G01R 31/31727* (2013.01); *G01R 31/318544* (2013.01)

(58) Field of Classification Search
CPC ........ G01R 31/31719; G01R 31/31727; G01R 31/318544; G01R 31/318555; G01R 31/318588
See application file for complete search history.

(56) References Cited

U.S. PATENT DOCUMENTS 4,833,397 A * 5/1989 McMurray, Jr. ... G01R 29/0273
                                                          324/73.1
5,394,443 A * 2/1995 Byers .................. H03K 5/1506
                                                           327/295

(Continued)

FOREIGN PATENT DOCUMENTS

JP        2012-068119       4/2012

OTHER PUBLICATIONS

Lee et al., "Securing Scan Design Using Lock & Key Technique", Nov. 2005, 10 pages.

(Continued)

*Primary Examiner* — Tung S Lau
(74) *Attorney, Agent, or Firm* — Morgan , Lewis & Bockius LLP

(57) ABSTRACT

A semiconductor integrated circuit to receive a test scan input, a test clock, and a test mode signal and output a secure scan output signal, the integrated circuit including: a secure key circuit to generate delay input signals, which are differently delayed from the test scan input, and to generate an input key signal by capturing the delay input signals in response to the test clock; a key comparator to generate a verification result indicating whether an input key of the input key signal is identical with a preset reference key; a chip to generate a scan output signal based on the test scan input; a scan output remapper to obfuscate the scan output signal according to the verification result and to output the obfuscated scan output signal as the secure scan output signal; and a secure scan controller to control the secure key circuit, key comparator, chip, and remapper.

15 Claims, 15 Drawing Sheets

(56) References Cited

U.S. PATENT DOCUMENTS

| | | | | |
|---|---|---|---|---|
| 5,422,918 | A * | 6/1995 | Vartti | G01R 25/005 327/12 |
| 5,761,097 | A * | 6/1998 | Palermo | G06F 30/3312 716/108 |
| 5,796,993 | A * | 8/1998 | Maguire | G06F 1/04 713/500 |
| 7,299,438 | B2 * | 11/2007 | Hosono | G01R 31/31725 703/19 |
| 7,634,701 | B2 | 12/2009 | Morgan et al. | |
| 7,966,535 | B2 | 6/2011 | Agarwal | |
| 8,412,996 | B2 * | 4/2013 | Bancel | G06K 19/07363 714/775 |
| 8,495,758 | B2 | 7/2013 | Goyal et al. | |
| 8,539,292 | B2 | 9/2013 | Nieuwland et al. | |
| 8,966,660 | B2 | 2/2015 | Koushanfar et al. | |
| 9,134,374 | B2 * | 9/2015 | Sunter | G01R 31/318577 |
| 9,727,754 | B2 | 8/2017 | Geukes et al. | |
| 2006/0109032 | A1 * | 5/2006 | Hosono | G01R 29/023 327/41 |
| 2011/0215851 | A1 * | 9/2011 | Oh | H03L 7/07 327/158 |
| 2014/0013124 | A1 * | 1/2014 | Little | H04L 9/0863 713/189 |
| 2015/0227413 | A1 * | 8/2015 | Marshall | G06F 1/04 714/3 |
| 2021/0083868 | A1 | 3/2021 | Lee et al. | |
| 2023/0244820 | A1 * | 8/2023 | Seidl | H03K 19/003 326/8 |

OTHER PUBLICATIONS

Woo et al., "A Secure Scan Architecture Protecting Scan Test and Scan Dump Using Skew-Based Lock and Key", IEEE Access, vol. 9, Jul. 2021, pp. 102161-102176.

* cited by examiner

FIG. 11

| CYCLE COUNT | PSO | LO | SE_1 | TCK_14 | TCK_13 | TCK_12 | TCK_11 | SR_A [3:0] | SE_2 | TCK_24 | TCK_23 | TCK_22 | TCK_21 | SR_B [3:0] | SSO |
|---|---|---|---|---|---|---|---|---|---|---|---|---|---|---|---|
| 0 | p0 | 0011 | 0 | - | - | En | En | X, X, 0, 0 | 1 | En | En | En | En | 4'b0 | 0 |
| 1 | p1 | 0001 | 0 | - | - | - | En | X, X, p0, p1 | 1 | En | En | En | En | 4'b0 | 0 |
| 2 | p2 | 1000 | 0 | En | - | - | - | p0, X, p0, p1 | 1 | En | En | En | En | 4'b0 | 0 |
| 3 | p3 | 0100 | 0 | - | En | - | - | p2, p3, p0, p1 | 1 | En | En | En | En | 4'b0 | 0 |
| 4 | p4 | 0010 | 1 | En | En | En | En | p3, p0, p0, 0 | 0 | - | En | En | - | 0, 0, p4, 0 | p2 |
| 5 | p5 | 1001 | 1 | En | En | En | En | p0, p1, 0, 0 | 0 | En | - | - | En | p5, 0, p4, p5 | p3 |
| 6 | p6 | 1100 | 1 | En | En | En | En | p1, 0, 0, 0 | 0 | En | En | - | - | p6, p6, p4, p5 | p0 |
| 7 | p7 | 0110 | 1 | En | En | En | En | 4'b0 | 0 | - | En | - | - | p6, p7, p7, p5 | p1 |
| 8 | p8 | 1011 | 0 | En | - | - | En | p8, 0, p8, p8 | 1 | En | En | En | En | p7, p7, p5, 0 | p6 |
| 9 | p9 | 0101 | 0 | - | En | - | - | p8, 0, p8, p9 | 1 | En | En | En | En | p7, p5, 0, 0 | p7 |
| 10 | pa | 1010 | 0 | En | - | En | - | pa, p9, p8, p9 | 1 | En | En | En | En | p5, 0, 0, 0 | p7 |
| 11 | pb | 1101 | 0 | En | - | - | En | pb, pb, pa, pb | 1 | En | En | En | En | 4'b0 | p5 |

FIG. 12

| CYCLE COUNT | PSO | MAP_SEL | SE_1 | TCK_14 | TCK_13 | TCK_12 | TCK_11 | SR_A [3:0] | SE_2 | TCK_24 | TCK_23 | TCK_22 | TCK_21 | SR_B [3:0] | SSO |
|---|---|---|---|---|---|---|---|---|---|---|---|---|---|---|---|
| 0 | p0 | { 2'b00, 2'b10, 2'b11, 2'b01 } | 0 | En | - | - | - | p0, 0, 0, 0 | 1 | En | En | En | En | 4'b0 | 0 |
| 1 | p1 | | 0 | - | - | - | En | p0, 0, 0, p1 | 1 | En | En | En | En | 4'b0 | 0 |
| 2 | p2 | | 0 | - | - | - | - | p0, p2, 0, p1 | 1 | En | En | En | En | 4'b0 | 0 |
| 3 | p3 | | 0 | - | - | En | - | p0, p2, p3, p1 | 1 | En | En | En | En | 4'b0 | 0 |
| 4 | p4 | | 1 | En | En | En | En | p2, p3, p1, 0 | 0 | En | - | - | - | p4, 0, 0, 0 | p0 |
| 5 | p5 | | 1 | En | En | En | En | p3, p1, 0, 0 | 0 | - | - | - | En | p4, 0, 0, p5 | p2 |
| 6 | p6 | | 1 | En | En | En | En | p1, 0, 0, 0 | 0 | - | En | - | - | p4, p6, 0, p5 | p3 |
| 7 | p7 | | 1 | En | En | En | En | 4'b0 | 0 | - | - | En | - | p4, p6, p7, p5 | p1 |

SEMICONDUCTOR INTEGRATED CIRCUIT, A METHOD FOR TESTING THE SEMICONDUCTOR INTEGRATED CIRCUIT, AND A SEMICONDUCTOR SYSTEM

CROSS-REFERENCE TO RELATED APPLICATION

This application claims priority under 35 U.S.C. § 119 to Korean Patent Application No. 10-2021-0128350, filed on Sep. 28, 2021, and Korean Patent Application No. 10-2021-0178879, filed on Dec. 14, 2021, in the Korean Intellectual Property Office, the disclosures of which are incorporated by reference herein in their entireties.

TECHNICAL FIELD

The inventive concept relates to an electronic apparatus, and more particularly, to a semiconductor integrated circuit, a method for testing the semiconductor integrated circuit, and a semiconductor system.

DISCUSSION OF RELATED ART

Design For Test (DFT) techniques provide support for testing complex integrated circuits (ICs) and system on chips (SOCs) as they provide a simple and effective means for reading, changing, and accessing components inside a device. Access to such devices is provided through scan chains. However, such access during testing may result in a number of security issues after a product is sold/disposed. For example, the same type of access can be used for malicious reasons such as to change the product, manipulate the product, disassemble the product, or imitate or perform malicious activities.

A typical solution for preventing the use of scan chain after testing is to ensure that an input key embedded in a test scanning input signal provided from outside the device corresponds to a preset authentication key. Generally, to capture the test scan input signal provided from outside the device in response to a clock signal, serialized flip-flops are used. However, when an authentication key input is received using the serialized flip-flops, the flip-flops need to be further connected in series to increase the security, which increases the complexity of the preset authentication key. This method not only increases the size of the chip, but also does not greatly contribute to further increasing the security of the product.

SUMMARY

An embodiment of the inventive concept provides a semiconductor integrated circuit that may further reinforce the security of a product without the addition of an element such as a flip-flop, a method for testing the semiconductor integrated circuit, and a semiconductor system.

According to an embodiment of the inventive concept, there is provided a semiconductor integrated circuit configured to receive a test scan input signal, a test clock signal, and a test mode signal from outside and output a secure scan output signal, the semiconductor integrated circuit including: a secure key circuit configured to generate a plurality of delay input signals, which are differently delayed from the test scan input signal, based on the test scan input signal and to generate an input key signal by capturing the plurality of delay input signals in response to the test clock signal; a key comparator configured to generate a verification result signal indicating whether an input key of the input key signal is identical with a preset reference key; a chip configured to generate a scan output signal based on the test scan input signal; a scan output remapper configured to obfuscate the scan output signal according to the verification result signal and to output the obfuscated scan output signal as the secure scan output signal; and a secure scan controller configured to control the secure key circuit, the key comparator, the chip, and the scan output remapper.

According to an embodiment of the inventive concept, there is provided a semiconductor integrated circuit configured to receive a test scan input signal, a test clock signal, and a test mode signal and output a secure scan output signal, the semiconductor integrated circuit including: a secure key circuit including N delay circuits and N flip-flops, wherein the N delay circuits are configured to receive the test scan input signal and to output N delay input signals (where N is an integer that is greater than or equal to 1) differently delayed from the test scan input signal and the N flip-flops are configured to latch logic values of the N delay input signals and to output an input key signal including the latched logic values; a key comparator configured to output a verification result signal indicating whether an input key of the input key signal is identical with a preset reference key; a chip configured to generate a scan output signal based on the test scan input signal; a scan output remapper configured to obfuscate the scan output signal in response to the verification result signal and to output the obfuscated scan output signal as the secure scan output signal; and a secure scan controller configured to control the secure key circuit, the key comparator, the chip, and the scan output remapper.

According to an embodiment of the inventive concept, there is provided a method for testing a semiconductor integrated circuit, the method including: changing a test scan input signal into a plurality of delay input signals having different delay values; generating an input key signal by obtaining values of the plurality of delay input signals in response to a test clock signal; verifying whether an input key according to the input key signal is identical with a preset reference key; and obfuscating a scan output signal output from a chip to be tested according to a result of the verifying.

According to an embodiment of the inventive concept, there is provided a semiconductor system including: a test device configured to output a test scan input signal, a test clock signal, and a test mode signal; and a semiconductor integrated circuit configured to receive the test scan input signal, the test clock signal, and the test mode signal and to output a secure scan output signal, wherein the semiconductor integrated circuit includes: N delay circuits configured to receive the test scan input signal and to output N (where N is an integer that is greater than or equal to 1) delay input signals, which are differently delayed from the test scan input signal; and N flip-flops connected in parallel to the N delay circuits, respectively, and configured to latch logic values of the N delay input signals in response to the test clock signal

BRIEF DESCRIPTION OF THE DRAWINGS

Embodiments of the inventive concept will be more clearly understood from the following detailed description taken in conjunction with the accompanying drawings in which:

FIG. 11 is a view illustrating a secure scan output signal output in a test mode;

FIG. 12 is a view illustrating a secure scan output signal output in a scan dump mode;

DETAILED DESCRIPTION OF THE EMBODIMENTS

Hereinafter, example embodiments of the inventive concept will be described in detail with reference to the accompanying drawings.

Figure 1:
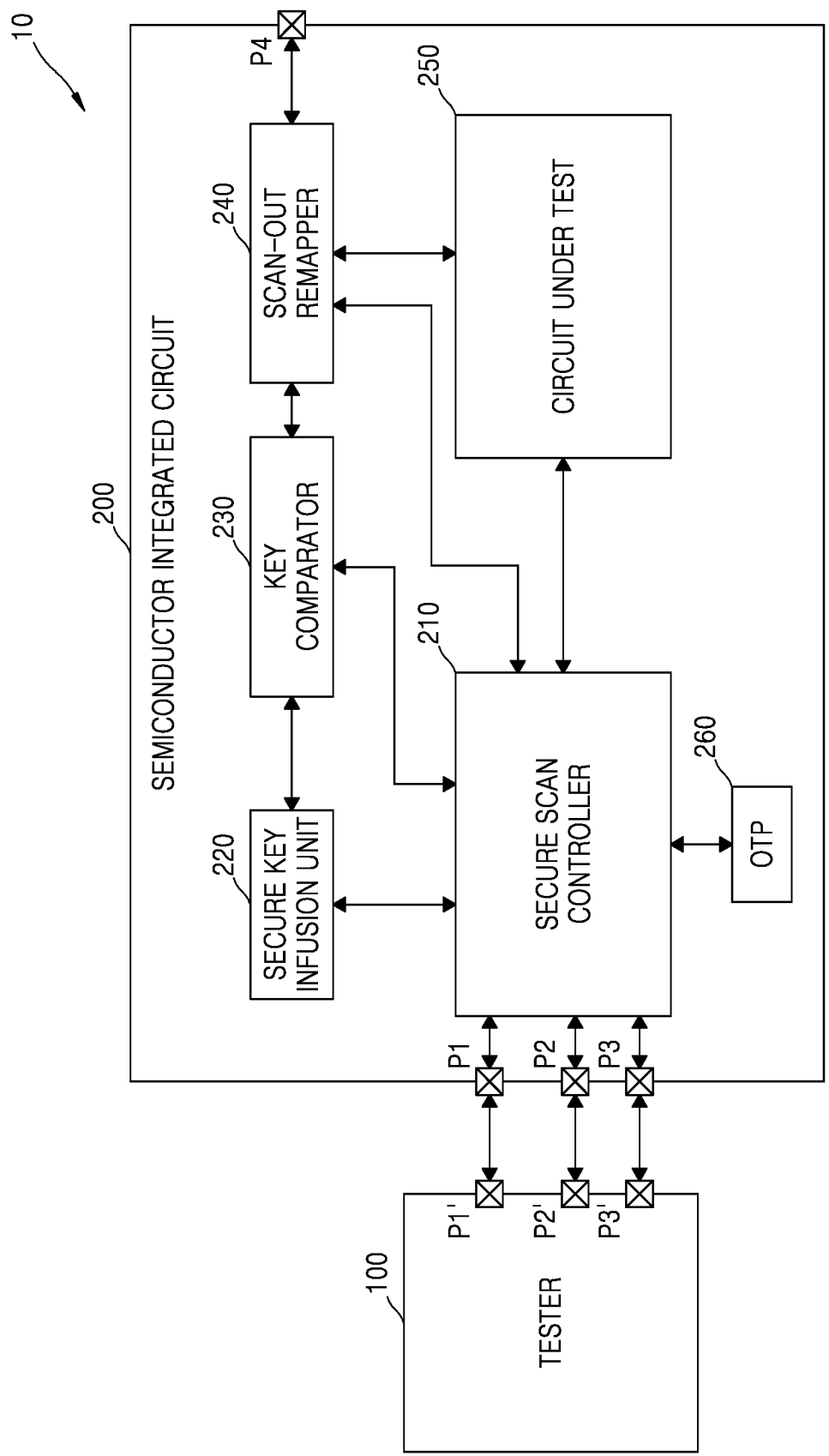
FIG. 1 is a view illustrating a semiconductor system according to an example embodiment of the inventive concept.

FIG. 1 is a view illustrating a semiconductor system according to an example embodiment of the inventive concept.

Referring to FIG. 1, a semiconductor system 10 may include a tester 100 and a semiconductor integrated circuit 200.

The tester 100 may be any device suitable for testing the semiconductor integrated circuit 200. The tester 100 may include a plurality of pins. Referring to FIG. 1, for example, the tester 100 may include a first pin P1', a second pin P2', and a third pin P3'. However, the example embodiment is not limited thereto. For example, the tester 100 may include more than three pins. The tester 100 may transmit a specific signal to the semiconductor integrated circuit 200 through each pin. For example, the tester 100 may output a test scan input signal through the first pin P1', may output a test clock signal through the second pin P2' and may output a test mode signal through the third pin P3'. The test scan input signal may be a signal that a user who is to perform a test may optionally input to perform the test. Alternatively, the test scan input signal may be a signal for authenticating whether a user who is to perform a test is qualified for performing a test for the semiconductor integrated circuit 200. The test clock signal may be a clock signal used in a test mode. The test clock signal may be toggled constantly at a specific period. In this case, when the specific period includes a preset cycle, the test clock signal may be toggled repeatedly for each cycle in the specific period. Alternatively, the test clock signal may be toggled only in at least one specific cycle among a plurality of cycles included in one period. For example, when one period of the test clock signal includes 100 cycles, the test clock signal may be toggled at a 70th cycle, 81th through 83th cycles, and a 99th cycle among 100 cycles. However, the example embodiment is not limited thereto The test mode signal may be a signal for performing a test mode. When a logic value of the test mode signal is a first value (or a first bit value, a logic high level), the test mode signal may indicate that the test mode is performed. Contrary to this, when a logic value of the test mode signal is a second value (or a second bit value, a logic low level), the test mode signal may indicate that the normal mode is performed. However, the example embodiment is not limited thereto. The tester 100 in the present specification may be referred to as a test device, a tester or the like.

In an embodiment of the inventive concept, the tester 100 that is a computer system may be provided with, for example, a personal computer or the like and may include a debugging program for a test.

The semiconductor integrated circuit 200 may include a plurality of pins to receive signals output from the tester 100. For example, the semiconductor integrated circuit 200 may include a first pin P1, a second pin P2, and a third pin P3 and may receive a test scan input signal, a test clock signal, and a test mode signal through each pin. For example, the first pin P1 of the semiconductor integrated circuit 200 may receive a test scan input signal. However, the example embodiment is not limited thereto. The semiconductor integrated circuit 200 may further include a pin for outputting a scan output signal generated as a result of performing the test. For example, the semiconductor integrated circuit 200 may include a fourth pin P4.

In an embodiment of the inventive concept, the semiconductor integrated circuit 200 may include a secure scan controller 210, a secure key infusion unit 220, a key comparator 230, a scan output remapper 240, a circuit under test 250, and a one time programmable memory (hereinafter, referred to as an OTP) 260.

Figure 2:
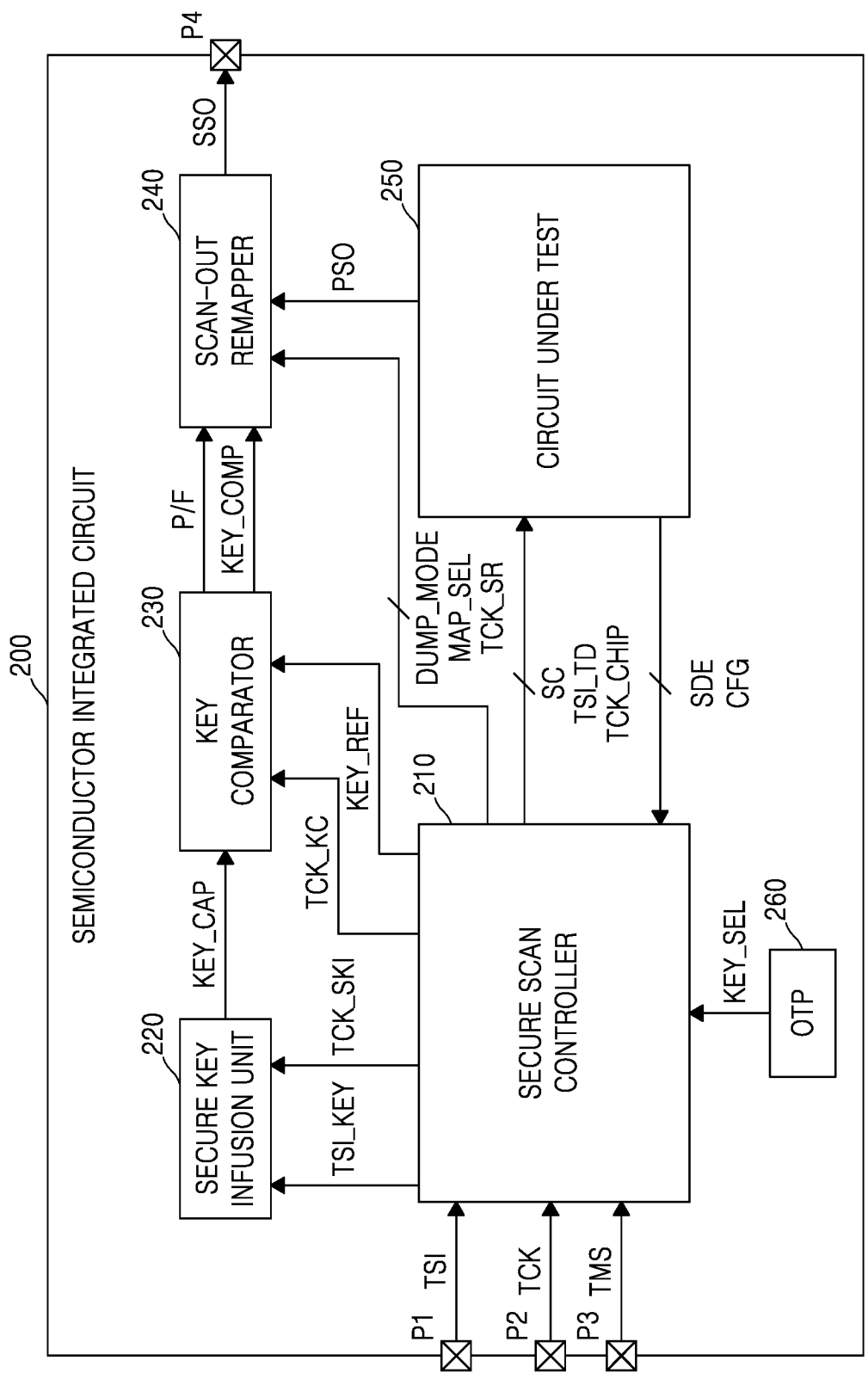
FIG. 2 is a view illustrating a semiconductor integrated circuit according to an example embodiment of the inventive concept.

FIG. 2 is a view illustrating a semiconductor integrated circuit according to an example embodiment of the inventive concept.

Referring to FIG. 2, the semiconductor integrated circuit 200 may receive a test scan input signal TSI through the first pin P1, a test clock signal TCK through the second pin P2, and a test mode signal TMS through the third pin P3 to output a secure scan output signal SSO. To accomplish this, the semiconductor integrated circuit 200 may include a secure scan controller 210, a secure key infusion unit 220, a key comparator 230, a scan output remapper 240, a circuit under test 250, and an OTP 260.

The secure scan controller 210 may control each of the secure key infusion unit 220, the key comparator 230, the scan output remapper 240, and the circuit under test 250. The secure scan controller 210 may receive the test scan input signal TSI, the test clock signal TCK, and the test mode signal TMS through the first through third pins P1, P2, and P3. In an embodiment of the inventive concept, when the test mode signal TMS has a first value, the secure scan controller 210 may transmit the test scan input signal TSI as a test key signal TSI_KEY to the secure key infusion unit 220 and may transmit a test clock signal TCK_SKI for the secure key infusion unit 220 to the secure key infusion unit 220. In an embodiment of the inventive concept, the secure scan controller 210 may transmit a test clock signal TCK_KC for the key comparator 230 to the key comparator 230 and may transmit a previously-stored reference key signal KEY_REF to the key comparator 230. In an embodiment of the inventive concept, the secure scan controller 210 may transmit a test clock signal TCK_SR for the scan output remapper 240 to the scan output remapper 240. In an embodiment of the inventive concept, the secure scan controller 210 may transmit a scan control signal SC, a test data TSI_TD, and a test clock signal TCK_CHIP for the circuit under test 250 to the circuit under test 250.

In another embodiment of the inventive concept, the secure scan controller 210 may receive a key selection signal KEY_SEL from the OTP 260 and may output one key selected by the key selection signal KEY_SEL among a plurality of previously-stored keys as a reference key signal KEY_REF.

In another embodiment of the inventive concept, the secure scan controller 210 may receive a scan dump enable signal SDE and a configuration signal CFG from the circuit under test 250 and may transmit a dump mode signal DUMP_MODE to the scan output remapper 240 to switch from a normal mode to a scan dump mode. The scan dump enable signal SDE may be a signal indicating that the scan dump mode is entering. The configuration signal CFG may be a signal indicating internal information of the circuit under test 250 in the scan dump mode.

In another embodiment of the inventive concept, the secure scan controller 210 may transmit a map selection signal MAP_SEL that allows an authorized user to decrypt the secure scan output signal SSO, to the scan output remapper 240.

The secure key infusion unit 220 may generate a plurality of delay input signals based on the test scan input signal TSI. The plurality of delay input signals may be signals differently delayed from the test scan input signal TSI. The secure key infusion unit 220 may generate an input key signal KEY_CAP by capturing the plurality of delay input signals in response to the test clock signal TCK. The secure key infusion unit 220 may provide the input key signal KEY_CAP to the key comparator 230.

The key comparator 230 may verify whether an input key according to the input key signal KEY_CAP is identical with a reference key according to the reference key signal KEY REF. Then, the key comparator 230 may generate a verification result signal P/F indicating a verification result. For example, the key comparator 230 may compare a value of the input key signal KEY_CAP with a value of the reference key signal KEY REF in response to the test clock signal TCK_KC for the key comparator 230 and may output the verification result signal P/F indicating a pass or fail state.

In an embodiment of the inventive concept, the key comparator 230 may additionally provide a comparison key signal KEY_COMP to the scan output remapper 240. The comparison key signal KEY_COMP may be, for example, a signal indicating an input key compared with a reference key in a cycle at which the test clock signal TCK_KC for the key comparator 230 is last toggled.

The scan output remapper 240 may obfuscate a scan output signal PSO according to a verification result using the verification result signal P/F and may output an obfuscated scan output signal as the secure scan output signal SSO.

In an embodiment of the inventive concept, when the verification result is passed, the scan output remapper 240 may output the scan output signal PSO through the fourth pin P4 without changes. In other words, when the verification result is passed, the scan output remapper 240 may not obfuscate the scan output signal PSO and may output the unobfuscated scan output signal PSO as the secure scan output signal SSO through the fourth pin P4 without changes.

In an embodiment of the inventive concept, when the verification result is failed, the scan output remapper 240 may generate obfuscation information for obfuscating the scan output signal PSO based on the comparison key signal KEY_COMP. The scan output remapper 240 may obfuscate the scan output signal PSO according to the obfuscation information.

In another embodiment of the inventive concept, the scan output remapper 240 may generate obfuscation information for obfuscating the scan output signal PSO based on the dump mode signal DUMP_MODE and the map selection signal MAP_SEL.

The circuit under test 250 may be a circuit or chip to be tested or debugged. The circuit under test 250 may include a plurality of synchronization circuits connected via one scan-chain. The circuit under test 250 may perform a scan operation based on the scan control signal SC and the test data TSI_TD received from the secure scan controller 210, and the circuit under test 250, may generate a scan output signal PSO, and may transmit the scan output signal PSO to the scan output remapper 240. The circuit under test 250 in the present specification may be referred to as a chip, a circuit, a core logic, an on-chip logic, or the like.

The OTP 260 may store authentication key data. The authentication key data may be data indicating an authentication key number generated by a manufacturer, or the like. The OTP 260 may output the authentication key data as the key selection signal KEY_SEL to the secure scan controller 210. The secure scan controller 210 may output one selected from the plurality of previously-stored keys by the key selection signal KEY_SEL as a reference key signal KEY_REF. The OTP 260 in the present specification may be implemented with a fuse, an anti-fuse, or an e-fuse.

Figure 3:
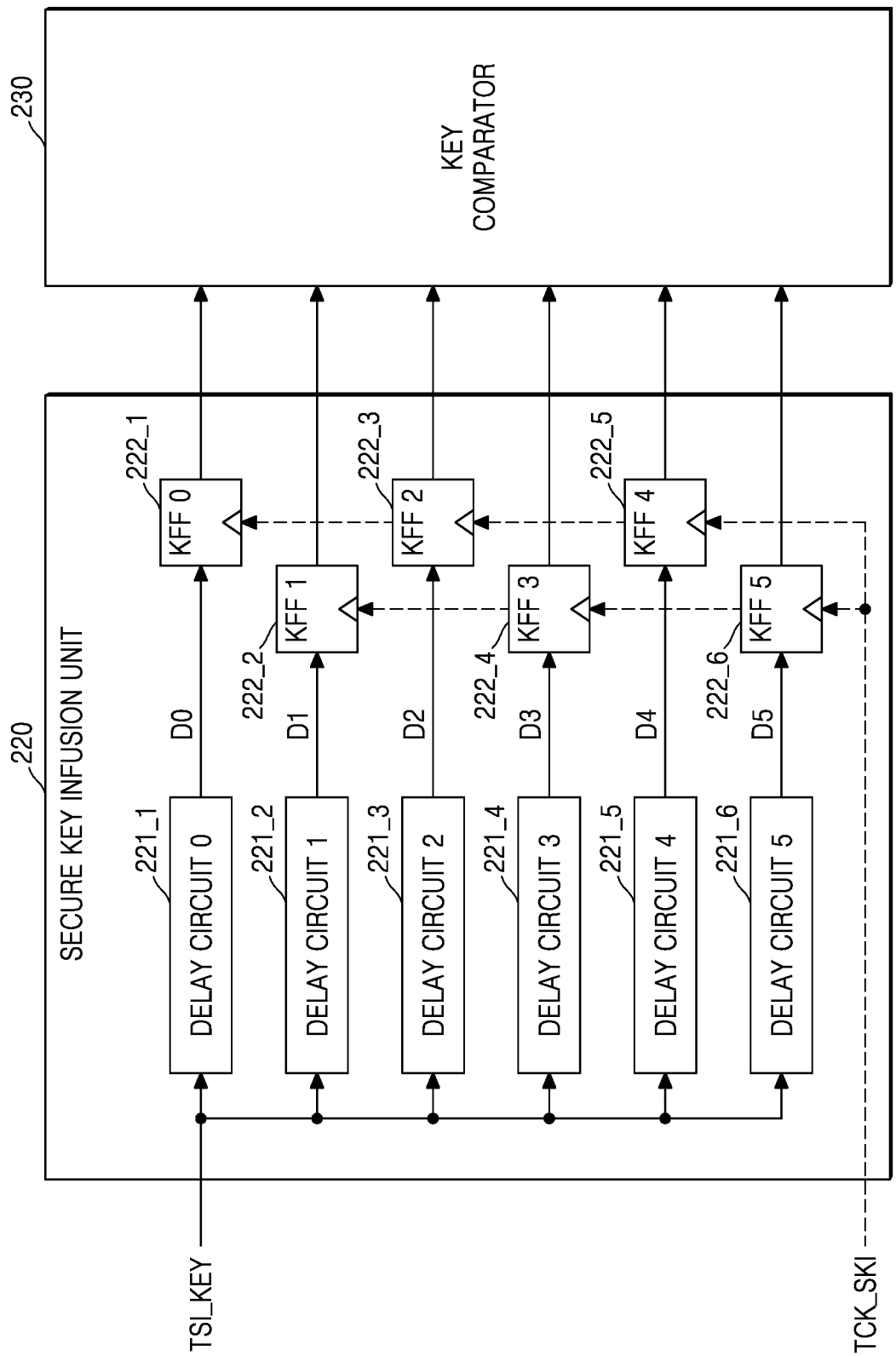
FIG. 3 is a view illustrating a secure key infusion unit according to an example embodiment of the inventive concept.

FIG. 3 is a view illustrating a secure key infusion unit according to an example embodiment of the inventive concept.

Referring to FIG. 3, the secure key infusion unit 220 may include N delay circuits and N flip-flops. N may be an integer that is greater than or equal to 1 Referring to FIG. 3, for example, the secure key infusion unit 220 may include first, second, third, fourth, fifth and sixth delay circuits 221_1, 221_2, 221_3, 221_4, 221_5, and 221_6, and first, second, third, fourth, fifth and sixth flip-flops 222_1, 222_2, 222_3, 222_4, 222_5, and 222_6. However, the example embodiment is not limited thereto. For example, there may be more than six or fewer than six delay circuits in the secure key infusion unit 220 and there may be more than six or fewer than six flip-flops in the secure key infusion unit 220. Hereinafter, for convenience of explanation, it is assumed that the number of delay circuits and the number of flip-flops included in the secure key infusion unit 220 are six.

The secure scan controller 210 may transmit the test scan input signal TSI as the test key signal TSI_KEY to the first through sixth delay circuits 221_1, 221_2, 221_3, 221_4, 221_5, and 221_6. In this case, the first through sixth delay circuits 221_1, 221_2, 221_3, 221_4, 221_5, and 221_6 may delay the test key signal TSI_KEY to output first through sixth delay input signals D0, D1, D2, D3, D4, and D5. For example, the first delay circuit 221_1 may delay the test key signal TSI_KEY to output the first delay input signal D0. Delay values of the first through sixth delay input signals D0, D1, D2, D3, D4, and D5 may be different from each other. The first through sixth delay input signals D0, D1, D2, D3, D4, and D5 may be transmitted to the first through sixth flip-flops 222_1, 222_2, 222_3, 222_4, 222_5, and 222_6, respectively.

The secure scan controller 210 may transmit the test clock signal TCK_SKI for the secure key infusion unit 220 to the first through sixth flip-flops 222_1, 222_2, 222_3, 222_4, 222_5, and 222_6. In this case, the first through sixth flip-flops 222_1, 222_2, 222 3, 222_4, 222_5, and 222_6 may latch logic values of the first through sixth delay input signals D0, D1, D2, D3, D4, and D5 in response to the test clock signal TCK_SKI and may transmit the latched values to the key comparator 230. Referring to FIG. 3, for example, the first flip-flop 222_1 may latch a logic value of the first delay input signal D0, the second flip-flop 222_2 may latch a logic value of the second delay input signal D1, and the third flip-flop 222_3 may latch a logic value of the third delay input signal D2 in response to the test clock signal TCK_SKI. Similarly, the fourth through sixth flip-flops 222_4, 222_5, and 222_6 may latch logic values of the fourth through sixth delay input signals D3, D4, and D5, respectively, in response to the test clock signal TCK_SKI.

Figure 4:
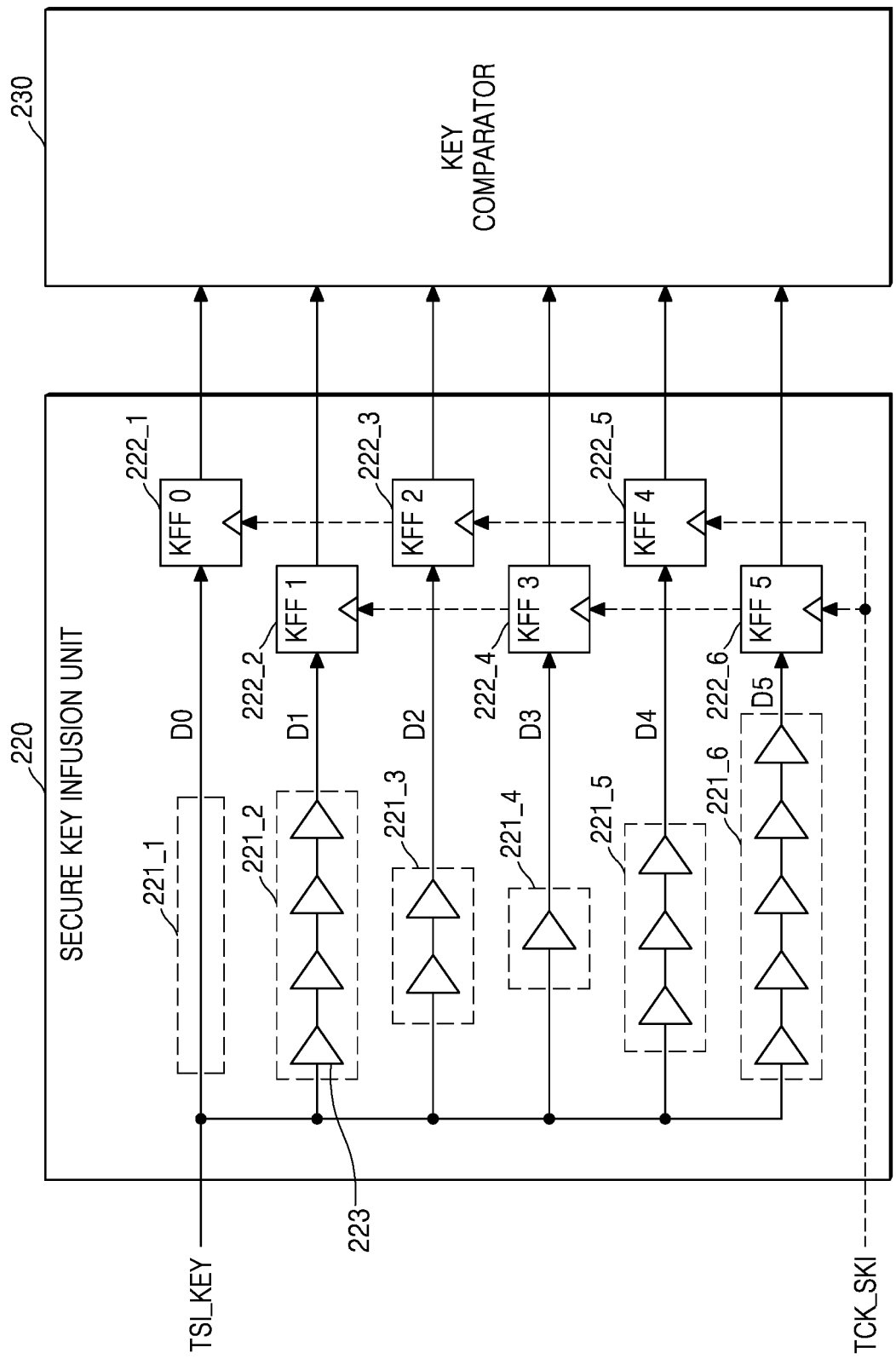
FIG. 4 is a view illustrating an example for implementing a secure key infusion unit according to an example embodiment of the inventive concept.

FIG. 4 is a view illustrating an example for implementing a secure key infusion unit according to an example embodiment of the inventive concept Referring to FIG. 4, at least one of the first through sixth delay circuits 221_1, 221_2, 221_3, 221_4, 221_5, and 221_6 may include one or more buffers. In this case, the number of buffers included in an i-th (where i is an integer that is less than or equal to N, for example, 1 to 6) among six, first through sixth delay circuits 221_1, 221_2, 221_3, 221_4, 221_5, and 221_6 may be different from the number of buffers included in an j-th (where j is different from i and an integer that is less than or equal to N) among the six, first through delay circuits 221_1, 221_2, 221_3, 221_4, 221_5, and 221_6.

Referring to FIG. 4, for example, the second delay circuit 221_2 may include four buffers 223, the third delay circuit 221_3 may include two buffers 223, the fourth delay circuit 221_4 may include one buffer 223, the fifth delay circuit 221_5 may include three buffers 223, and the sixth delay circuit 221_6 may include five buffers 223. The first delay circuit 221_1 may include no buffer 223. However, the example embodiment is not limited thereto, and the number of buffers included in each delay circuit may be different from that shown in FIG. 3. The larger the number of buffers 223, the larger the delay value. In other words, as the number of buffers 223 increases, the test key signal TSI_KEY may be more delayed.

In an embodiment of the inventive concept, one delay circuit among the six, first through sixth delay circuits 221_1, 221_2, 221_3, 221_4, 221_5, and 221_6 may not include a buffer. In this case, one delay circuit among the first through sixth delay circuits 221_1, 221_2, 22_3, 221_4, 221_5, and 221_6 may transmit the test key signal TSI_KEY to a corresponding flip-flop. Referring to FIG. 4, for example, the first delay circuit 221_1 may not include a buffer, and the first delay circuit 221_1 may input the test key signal TSI_KEY to the first flip-flop 222_1. However, the example embodiment is not limited thereto.

Figure 5:
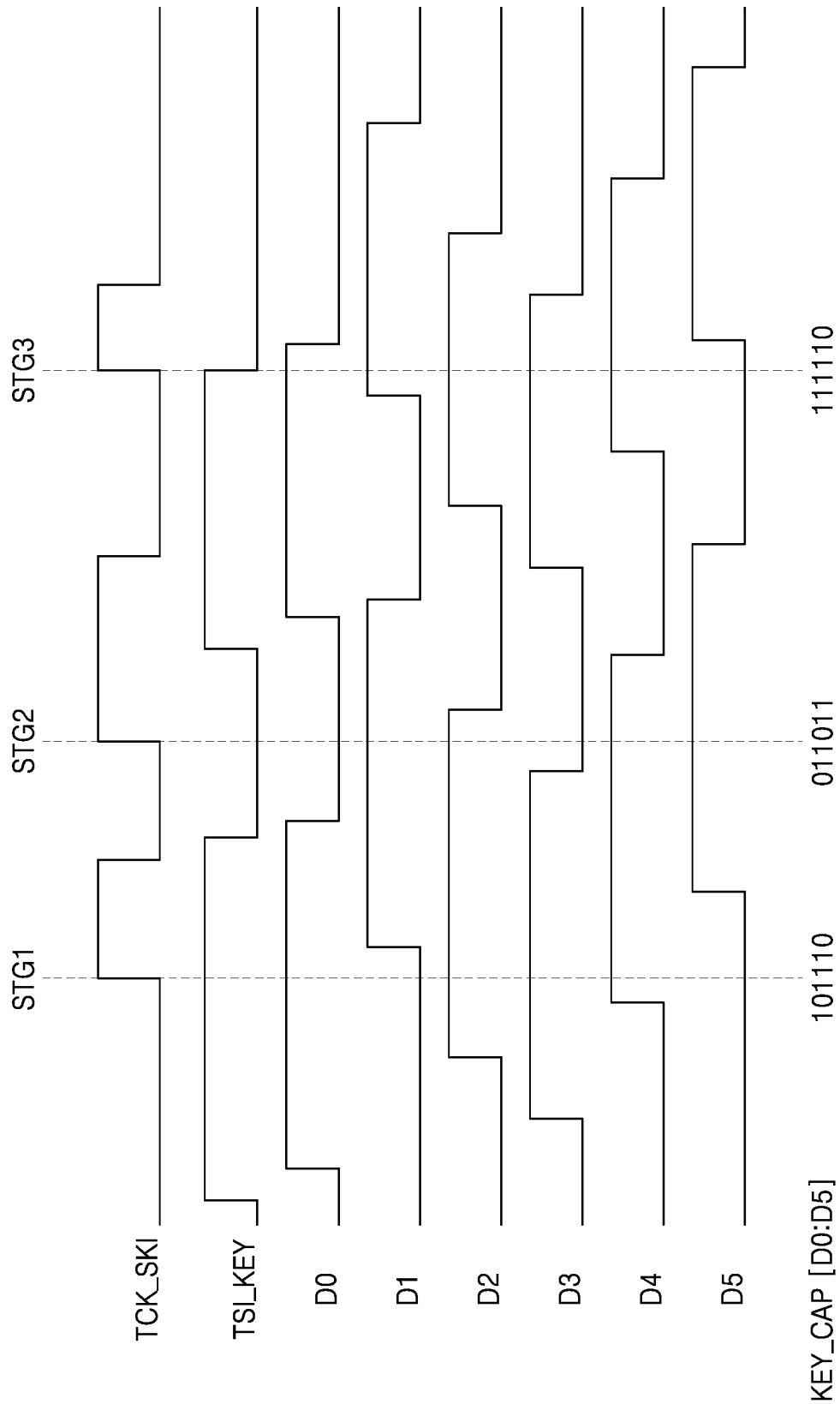
FIG. 5 is a timing diagram illustrating a method of generating an input key signal according to an example embodiment of the inventive concept.

FIG. 5 is a timing diagram illustrating a method of generating an input key signal according to an example embodiment of the inventive concept.

Referring to FIGS. 4 and 5, the test clock signal TCK_SKI and the test key signal TSI_KEY may be transmitted to the secure key infusion unit 220. The test clock signal TCK_SKI may be toggled only in a specific cycle in one period. The test key signal TSI_KEY may have a first logic value (for example, a logic high level) from a specific time point to another specific time point. Each of the test clock signal TCK_SKI and the test key signal TSI_KEY may have a first logic value or a second logic value. Hereinafter, for convenience, it is assumed that the first logic value is a logic high level or 1 bit, and the second logic value is a logic low level or 0 bit.

The first through sixth delay input signals D0, D1, D2, D3, D4, and D5 may be signals in which the test key signal TSI_KEY is delayed. Each of the first through sixth delay input signals D0, D1, D2, D3, D4, and D5 may have a first logic value or a second logic value. When it is assumed that the number of buffers 223 included in each delay circuit is as shown in FIG. 4, delay values may increase in order from the first delay input signal D0, the fourth delay input signal D3, the third delay input signal D2, the fifth delay input signal D4, the second delay input signal D1, and the sixth delay input signal D5. In other words, the sixth delay input signal D5 may have the largest delay.

In an embodiment of the inventive concept, the first through sixth flip-flops 222_1, 222_2, 222_3, 222_4, 222_5, and 222_6 may latch logic values of the first through sixth delay input signals D0, D1, D2, D3, D4, and D5 at a rising edge of the test clock signal TCK_SKI in response to the rising edge of the test clock signal TCK_SKI. Referring to FIG. 5, for example, at a first stage STG1, the rising edge of the test clock signal TCK_SKI may be generated. In this case, a logic value of the first delay input signal D0 may be a first logic value (or a logic high level, or 1 bit), a logic value of the second delay input signal D1 may be a second logic value (or a logic low level, or 0 bit), and a logic value of the third delay input signal D2 through fifth delay input signals D4 may be the first logic value, and a logic value of the sixth delay input signal D5 may be the second logic value. The first through sixth flip-flops 222_1, 222_2, 222_3, 222_4, 222_5, and 222_6 may capture an input key KEY_CAP [D0:D5] including latched logic values, and at this time, the input key KEY_CAP [D0:D5] may be "101110". Referring to FIG. 5, in another example, at a second stage STG2, the rising edge of the test clock signal TCK_SKI may be generated. In this case, the logic value of the first delay input signal D0 may be the second logic value, the logic value of the second and third delay input signals D1 and D2 may be the first logic value, the logic value of the fourth delay input signal D3 may be the second logic value, and the logic value of the fifth and sixth delay input signals D4 and D5 may be the first logic value. In this case, the input key KEY_CAP [D0:D5] including the latched logic values may be "011011". Referring to FIG. 5, in another example, at a third stage STG3, the rising edge of the test clock signal TCK_SKI may be generated. In this case, the logic value of the first through fifth delay input signals D0, D1, D2, D3, and D4 may be the first logic value, and the logic value of the sixth delay input signal D5 may be the second logic value. In this case, the input key KEY_CAP [D0:D5] may be "111110".

The secure key infusion unit 220 may generate the logic values of the first through sixth delay input signals D0, D1, D2, D3, D4, and D5 at the rising edge of the test clock signal TCK_SKI as the input key signal KEY_CAP and may provide the input key signal KEY_CAP to the key comparator 230.

When the test clock signal TCK_SKI is toggled for the first through sixth flip-flops 222_1, 222_2, 222_3, 222_4, 222_5 and 222_6, the number of cases of the input key KEY_CAP [D0:D5] that may be captured by the first through sixth flip-flops 222_1, 222_2, 222_3, 222_4, 222_5, and 222_6 may be 2^6. Thus, to acquire the same input key as the reference key input to the key comparator 230, the user needs to know each of the individual times when transition of the test key signal TSI_KEY reaches each of the first through sixth flip-flops 222_1, 222_2, 222_3, 222_4, 222_5, and 222_6 and needs to accurately input a skew between the transition of the test key signal TSI_KEY to capture a desired key value and the test clock signal TCK_SKI. Thus, according to the present example embodiment, a malicious user may not be able to accurately input the skew between the transition of the test key signal TSI_KEY and the test clock signal TCK_SKI, so that security is enhanced.

Figure 6:
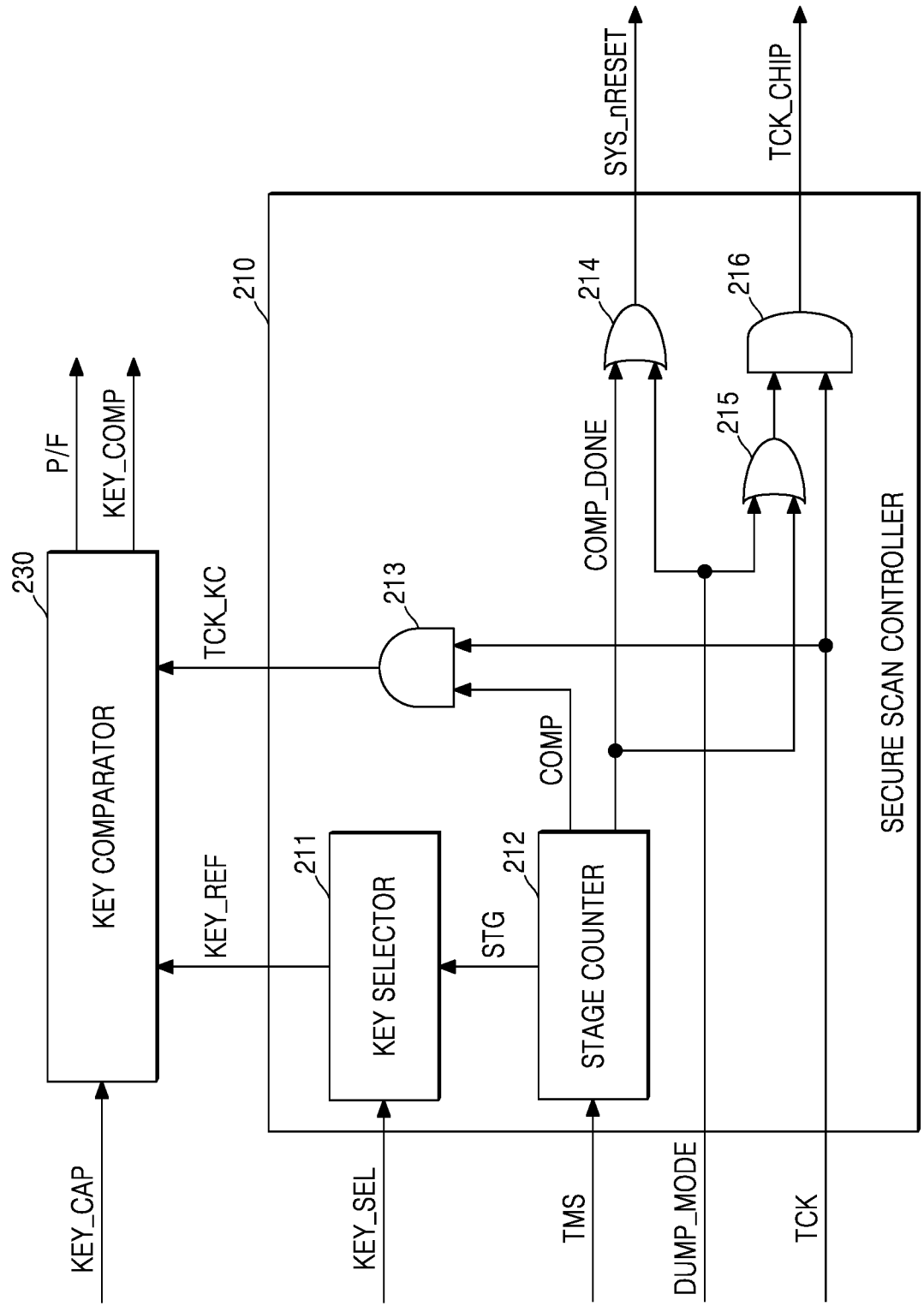
FIG. 6 is a view illustrating an implementation example of a secure scan controller for controlling a key comparator according to an example embodiment of the inventive concept.

As described above, the degree of encryption may be increased without having to add a flip-flop, which is generally used to promote higher security and reliability FIG. 6 is a view illustrating an implementation example of a secure scan controller for controlling a key comparator according to an example embodiment of the inventive concept.

Referring to FIG. 6, the secure scan controller 210 may provide the reference key signal KEY_REF and the test clock signal TCK KC for the key comparator 230 to the key comparator 230. The secure scan controller 210 may count a stage corresponding to the number of times a plurality of delay input signals are captured, whenever the plurality of delay input signals are captured. Referring to FIGS. 4 and 6, for example, the secure scan controller 210 may count the first stage STG1 when the first through sixth delay input signals D0, D1, D2, D3, D4, and D5 are captured at the first stage STG1. The secure scan controller 210 may count the second stage STG2 when the first through sixth delay input signals D0, D1, D2, D3, D4, and D5 are captured at the second stage STG2. The secure scan controller 210 may count the third stage STG3 when the first through sixth delay input signals D0, D1, D2, D3, D4, and D5 are captured at the third stage STG3. The secure scan controller 210 may provide a key corresponding to the counted stage among a plurality of previously-stored keys as a reference key to the comparator 230.

In an example embodiment of the inventive concept, the secure scan controller 210 may include a key selector 211, a stage counter 212, a first logic product gate 213, a first logic sum gate 214, a second logic sum gate 215, and a second logic product gate 216.

The key selector 211 may select one key among the plurality of previously-stored keys according to the counted stage as a reference key in response to the stage signal STG to transmit the reference key signal KEY_REF to the comparator 230. In an example embodiment of the inventive concept, the key selector 211 may transmit the reference key signal KEY_REF to the key comparator 230 in response to the key selection signal KEY_SEL received from the OTP 260.

The stage counter 212 may output a stage corresponding to the number of times the logic values of N delay input signals are latched, to output the stage signal STG indicating the counted stage. Referring to FIGS. 5 and 6, for example, the stage counter 212 may output the stage signal STG sequentially indicating the first stage STG1, the second stage STG2, and the third stage STG3. The stage counter 212 may output a comparison signal COMP indicating a comparison operation whenever the stage is counted. The comparison signal COMP may have a first logic value or a second logic value, and while the stage is counted, the comparison signal COMP may have the first logic value. When the comparison operation of the key comparator 230 is completed or a preset stage count number is satisfied, the stage counter 212 may output a comparison completion signal COMP_DONE to the first logic sum gate 214. The comparison completion signal COMP_DONE may have the first logic value or the second logic value. When the comparison operation of the key comparator 230 is completed, the comparison signal COMP may have the second logic value, and the comparison completion signal COMP_DONE may have the first logic value.

The first logic product gate 213 may perform a logic product operation of the comparison signal COMP and the test clock signal TCK to provide the result of the logic product operation as the test clock signal TCK_KC for the key comparator 230 to the key comparator 230. The first logic product gate 213 may be an AND gate.

The first logic sum gate 214 may perform a logic sum operation of the comparison completion signal COMP_DONE and the dump mode signal DUMP_MODE to provide the result of the logic sum operation as a system reset signal SYS_nRESET to the circuit under test 250. The dump mode signal DUMP_MODE may have the first logic value or the second logic value. When the dump mode signal DUMP_MODE has the first logic value, this may mean that the scan dump mode is entering. The system reset signal SYS_nRESET may be a signal indicating that the circuit under test 250 is reset.

The second logic sum gate 215 may perform a logic sum operation of the comparison completion signal COMP_DONE and the dump mode signal DUMP_MODE to provide the result of the logic sum operation to the second logic product gate 216.

The second logic product gate 216 may perform a logical product operation of an output of the second logic sum gate 215 and the test clock signal TCK provided from the outside to output the result of the logic product operation as the test clock signal TCK_CHIP for the circuit under test 250.

When the input key by the input key signal KEY_CAP is identical with the reference key by the reference key signal KEY_REF, the key comparator 230 may output a signal indicating a pass state as the verification result signal P/F. In this case, the signal indicating a pass state may be a signal having a first logic value, for example. On the other hand, when the input key signal KEY_CAP is different from the reference key signal KEY_REK, the key comparator 230 may output a signal indicating a fail state as the verification result signal P/F. In this case, the signal indicating a fail state may be a signal having a second logic value, for example. However, the example embodiment is not limited thereto.

Figure 7:
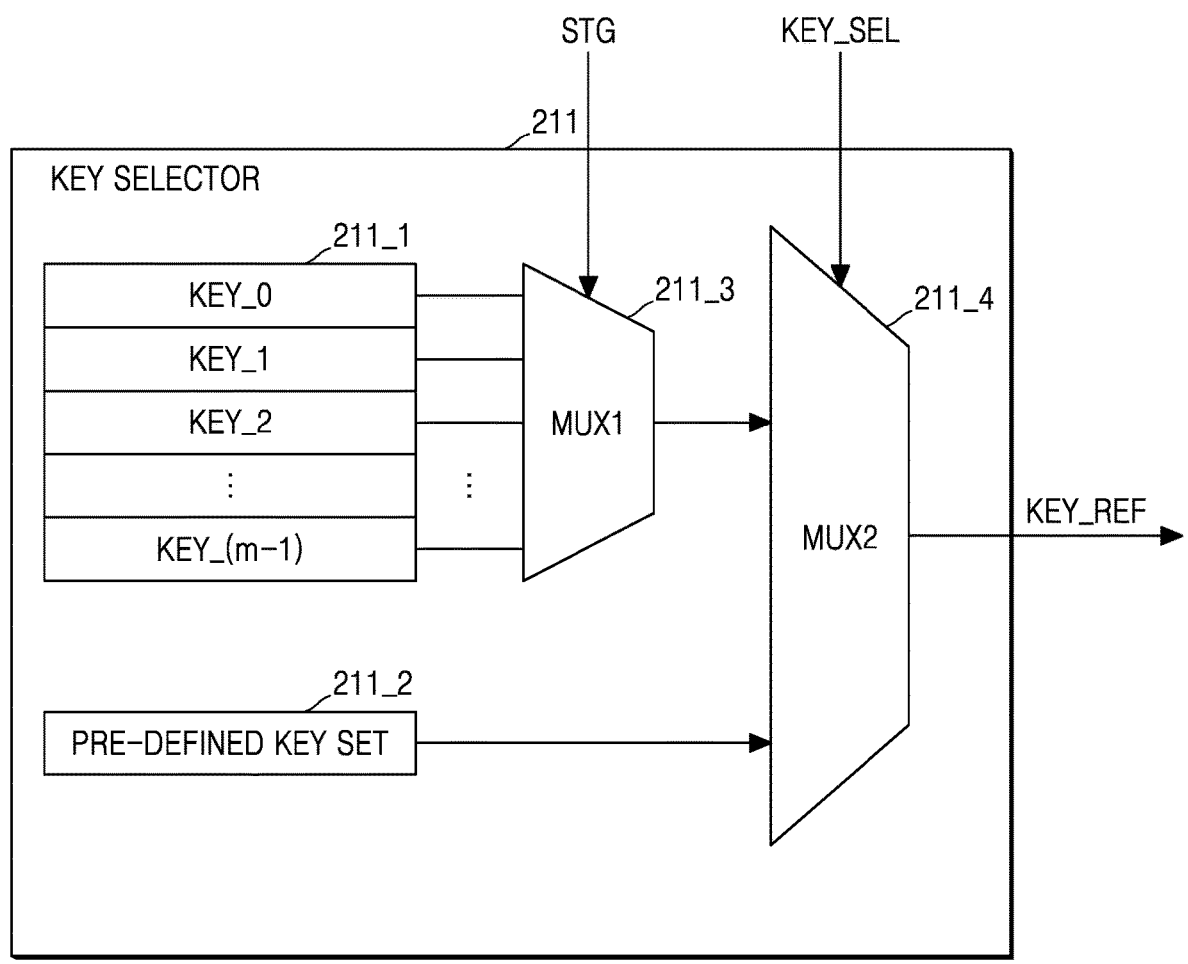
FIG. 7 is a view illustrating an implementation example of a key selector shown in FIG. 6.

FIG. 7 is a view illustrating an implementation example of the key selector shown in FIG. 6.

Referring to FIGS. 5, 6, and 7, the key selector 211 may previously store stage keys 211_1 corresponding to the stage and an authentication key set 211_2 corresponding to an authentication key number. The authentication key set 211_2 may be referred to as a pre-defined key set. The key selector 211 may include a first multiplexer 211_3 and a second multiplexer 211_4. The number of stage keys 211_1 may be m, however, the number of stage keys 211_1 is not limited thereto. Here, m may be an integer that is greater than or equal to 2.

The first multiplexer 211_3 may output a stage key selected among the stage keys 211_1 according to the stage signal STG. Referring to FIGS. 5 and 7, for example, when the stage signal STG indicates the first stage STG1, the first multiplexer 211_3 may output a first stage key KEY_0.

The second multiplexer 211_4 may select a key according to the stage key selected by the first multiplexer 211_3 and the key selection signal KEY_SEL (or authentication key data) among the authentication key set 211_2 to output the reference key signal KEY_REF.

Figure 8:
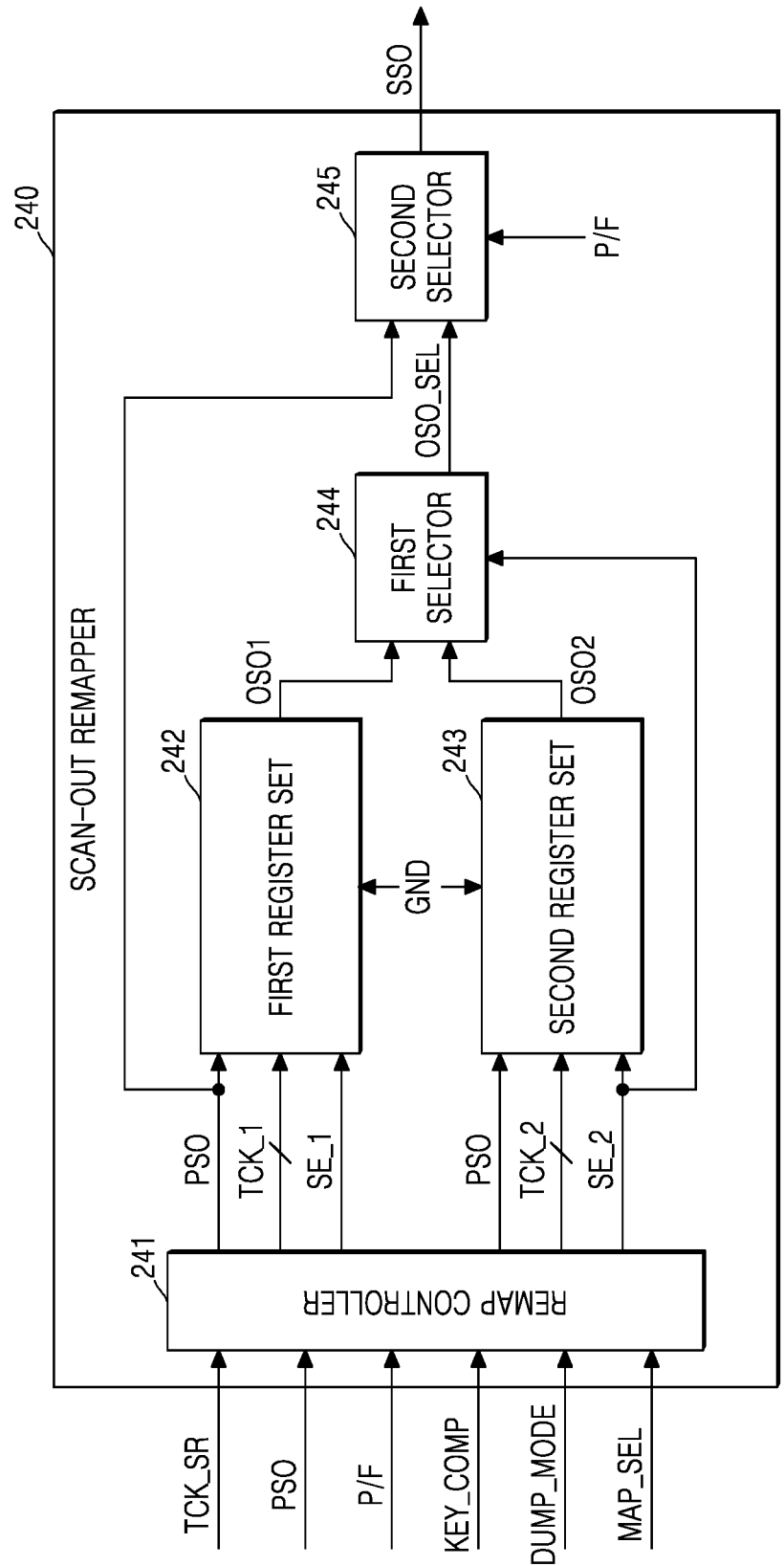
FIG. 8 is a view illustrating a scan output remapper according to an example embodiment of the inventive concept.

FIG. 8 is a view illustrating a scan output remapper according to an example embodiment of the inventive concept.

Referring to FIG. 8, the scan output remapper 240 may include a remap controller 241, a first register set 242, a second register set 243, a first selector 244, and a second selector 245.

The remap controller 241 may receive the test clock signal TCK_SR, the scan output signal PSO, the verification result signal P/F, the dump mode signal DUMP_MODE, and the comparison key signal KEY_COMP. According to an example embodiment of the inventive concept, the remap controller 241 may further receive a map selection signal MAP_SEL. The remap controller 241 may transmit the scan output signal PSO to the first and second register sets 242 and 243. The remap controller 241 may output the first clock signal TCK_1 to the first register set 242 and may output the second clock signal TCK_2 to the second register set 243 based on the test clock signal TCK_SR and the comparison key signal KEY_COMP. The remap controller 241 may output a first scan enable signal SE_1 to the first register set 242 and may provide and output a second scan enable signal SE_2 to the second register set 243. According to an example embodiment of the inventive concept, the second scan enable signal SE 2 may be a signal in which the first scan enable signal SE_1 is inverted.

The first register set 242 may latch the scan output signal PSO in response to the first scan enable signal SE_1 and the first clock signal TCK_1 and may output the latched first scan output signal OSO1. The first register set 242 may be connected to a ground GND.

The second register set 243 may latch the scan output signal PSO in response to the second scan enable signal SE_2 and the second clock signal TCK_2 and may output the latched second scan output signal OSO2. The second register set 243 may be connected to the ground GND.

The first selector 244 may select one among the first scan output signal OSO1 and the second scan output signal OSO2 according to the second scan enable signal SE_2.

The second selector 245 may output one of the scan output signal OSO_SEL selected by the first selector 244 and the scan output signal PSO as the secure scan output signal SSO according to the verification result signal P/F.

Figure 9:
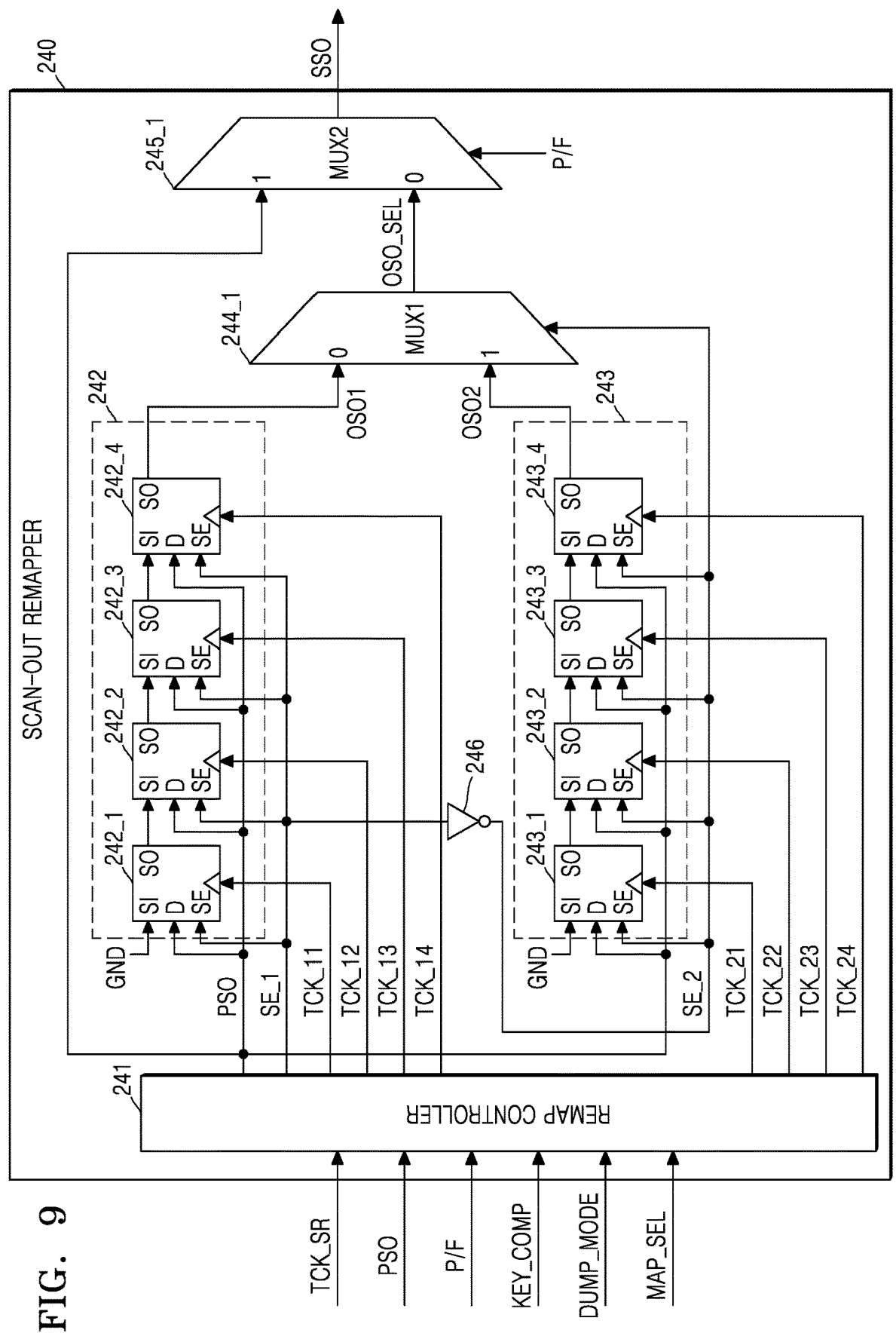
FIG. 9 is a view illustrating an example for implementing a scan output remapper according to an example embodiment of the inventive concept.

FIG. 9 is a view illustrating an example for implementing a scan output remapper according to an example embodiment of the inventive concept.

Referring to FIG. 9, the first register set 242 may include r first flip-flops (where r is an integer that is greater than or equal to 1) serially cascaded. The serially-cascaded flip-flops may have a shape in which an output terminal of a current flip-flop is connected to an input terminal of a next flip-flop. Referring to FIG. 9, for example, the first register set 242 may include four first flip-flops 242_1, 242_2, 242_3, and 242_4 in which an output of the current flip-flop and the input of the next flip-flop are connected to each other. However, the example embodiment is not limited thereto. For example, more than four flip-flops may be included in the first register set 242. Hereinafter, it is assumed that the number of first flip-flops is four. Each of the first flip-flops 242_1, 242_2, 242_3, and 242_4 may latch the scan output signal PSO in response to the rising edge of the four first clock signals TCK_11, TCK_12, TCK_13, and TCK_14. The first flip-flop 242_1 among the first flip-flops 242_1, 242_2, 242_3 and 242_4 may receive the ground GND from a scan input terminal SI, and in three first flip-flops 242_2, 242_3, and 242_4, a scan output terminal SO of a previous flip-flop may be connected to the scan input terminal SI of the next flip-flop. The first flip-flop 242_4 may correspond to most significant bit (MSB), and the first flip-flop 242_1 may correspond to least significant bit (LSB).

The second register set 243 may include r second flip-flops serially cascaded. Referring to FIG. 9, for example, the second register set 243 may include four second flip-flops 243_1, 243_2, 243_3, and 243_4 in which an output of the current flip-flop and the input of the next flip-flop are connected to each other. However, the example embodiment is not limited thereto. For example, the second register set 243 may include more than four flip-flops. Hereinafter, it is assumed that the number of second flip-flops is four. Each of the second flip-flops 243_1, 243_2, 243_3, and 243_4 may latch the scan output signal PSO in response to the rising edge of the four second clock signals TCK_21, TCK_22, TCK_23, and TCK_24. The second flip-flop 243_1 among the second flip-flops 243_1, 243_2, 243_3 and 243_4 may receive the ground GND from the scan input terminal SI, and in three second flip-flops 243_2, 243_3, and 243_4, the scan output terminal SO of a previous flip-flop may be connected to the scan input terminal SI of the next flip-flop. The second flip-flop 243_4 may correspond to MSB, and the second flip-flop 243_1 may correspond to LSB.

The remap controller 241 may output four first clock signals TCK_11, TCK_12, TCK_13, and TCK 14 to the first register set 242. The remap controller 241 may output four second clock signals TCK_21, TCK_22, TCK_23, and TCK_24 to the second register set 243. The remap controller 241 may output a first scan enable signal SE 1 to the first register set 242.

The scan output remapper 240 may further include an inverter 246. The inverter 246 may invert the first scan enable signal SE_1 to output the second scan enable signal SE_2 to the second register set 243.

In an example embodiment of the inventive concept, the first selector 244 may be implemented with a first multiplexer 244_1. However, the example embodiment is not limited thereto. The first multiplexer 244_1 may select and output the first scan output signal OSO1 or the second scan output signal OSO2 according to a logic value of the second scan enable signal SE_2. For example, when the logic value of the second scan enable signal SE_2 is a first logic value (e.g., a logic high level), the first multiplexer 244_1 may output the second scan output signal OSO2. In another example, when the logic value of the second scan enable signal SE_2 is a second logic value (e.g., a logic low level), the first multiplexer 244_1 may output the first scan output signal OSO1.

In an example embodiment of the inventive concept, the second selector 245 may be implemented with a second multiplexer 245_1. However, the example embodiment is not limited thereto. The second multiplexer 245_1 may select and output the scan output signal OSO_SEL selected by the first multiplexer 244_1 or the scan output signal PSO selected according to a logic value of the verification result signal P/F. For example, when the logic value of the verification result signal P/F is a first logic value (e.g., a pass state or a logic high level), the second multiplexer 245_1 may output the scan output signal PSO as the secure scan output signal SSO. In another example, when the logic value of the verification result signal P/F is a second logic value (e.g., a fail state or a logic low level), the second multiplexer 245_1 may output the selected scan output signal OSO_SEL as the secure scan output signal SSO.

Figure 10:
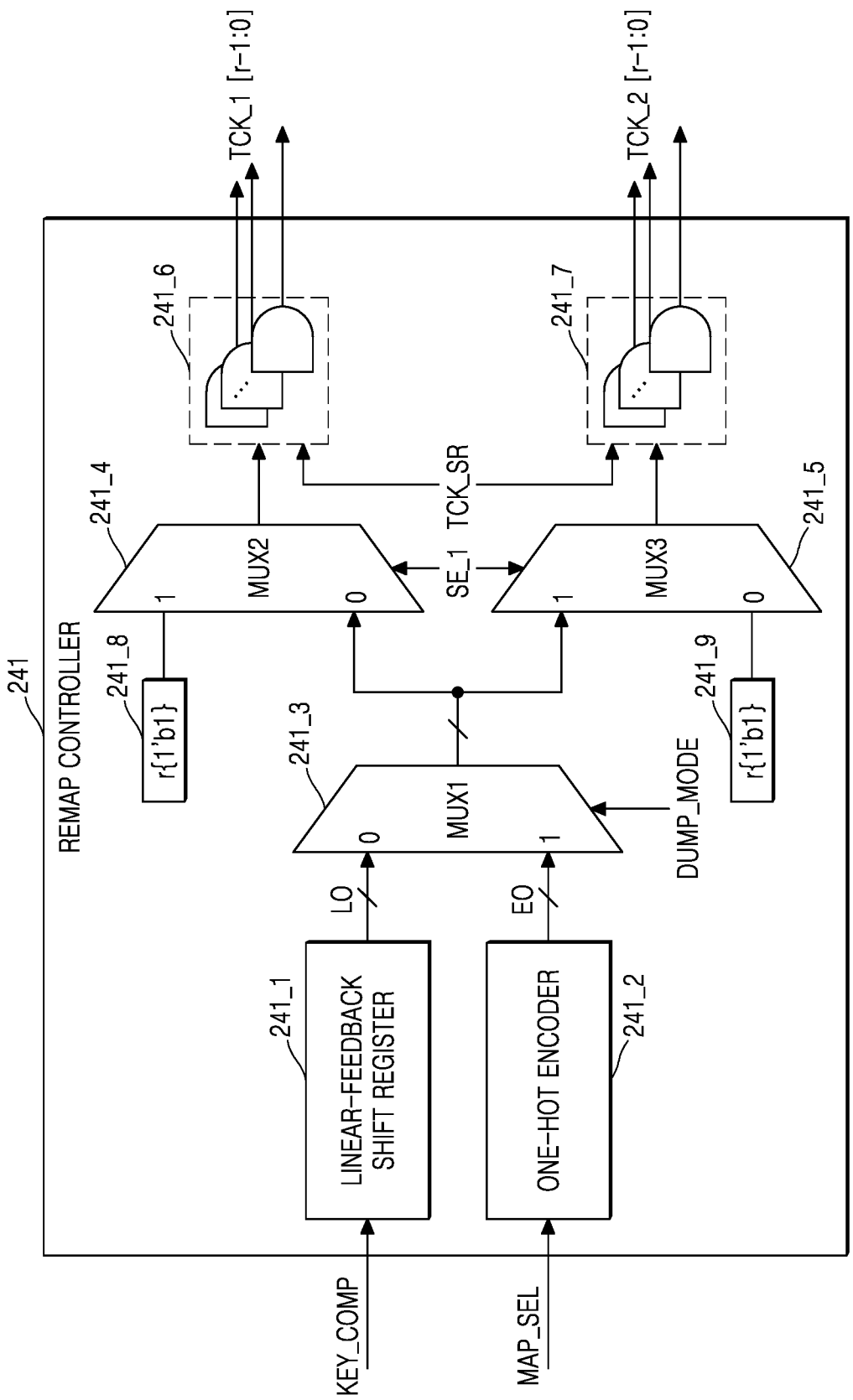
FIG. 10 is a view illustrating an implementation example of a remap controller according to an example embodiment of the inventive concept.

FIG. 10 is a view illustrating an implementation example of a remap controller according to an example embodiment of the inventive concept.

Referring to FIG. 10, the remap controller 241 may generate obfuscation information for obfuscating the scan output signal PSO based on the comparison key signal KEY_COMP and may obfuscate the scan output signal PSO according to the obfuscation information. The obfuscation information may be indicated as a rising edge timing of r first clock signals TCK_1 [r−1:0] or r second clock signals TCK_2 [r−1:0].

The remap controller 241 may include a linear-feedback shift register 241_1, a one-hot encoder 241_2, a first multiplexer 241_3, a second multiplexer 241_4, a third multiplexer 241_5, r first logic product gates 241_6, and r second logic product gates 241_7.

The linear-feedback shift register 241_1 may output r linear signals LO based on the comparison key signal KEY_COMP. Here, the number of linear signals LO may be the same as the number of flip-flops included in the first and second register sets 242 and 243.

The one-hot encoder 241_2 may output r encoding signals EO based on a map selection signal MAP_SEL. Here, the number of encoding signals EO may be the same as the number of flip-flops included in the first and second register sets 242 and 243.

The r linear signals LO and the r encoding signals EO may correspond to the above-described obfuscation information.

The first multiplexer 241_3 may output the r linear signals LO or the r encoding signals EO according to the logic value of the dump mode signal DUMP_MODE. For example, when the logic value of the dump mode signal DUMP_MODE is the first logic value, the first multiplexer 241_3 may output r encoding signals EO. In another example, when the logic value of the dump mode signal DUMP_MODE is the second logic value, the first multiplexer 241_3 may output r linear signals LO.

The second multiplexer 241_4 may output first data 241_8 having a previously-stored first logic value or an output signal of the first multiplexer 241_3 according to the logic value of the first scan enable signal SE_1. For example, when the logic value of the first scan enable signal SE_1 is the first logic value, the second multiplexer 241_4 may output the first data 241_8. In another example, when the logic value of the first scan enable signal SE_1 is the second logic value, the second multiplexer 241_4 may output an output signal of the first multiplexer 241_3.

The third multiplexer 241_5 may output second data 241_9 having a previously-stored first logic value or an output signal of the first multiplexer 241_3 according to the logic value of the first scan enable signal SE_1. For example, when the logic value of the first scan enable signal SE_1 is the first logic value, the third multiplexer 241_5 may output an output signal of the first multiplexer 241_3. In another example, when the logic value of the first scan enable signal SE_1 is the second logic value, the third multiplexer 241_5 may output the second data 241_9.

According to an example embodiment of the inventive concept, the first data 241_8 and the second data 241_9 may be stored as one data in the same storage space or may be stored in different storage spaces.

The r first logic product gates 241_6 may perform a logic product operation of the test clock signal TCK_SR for the scan output remapper 240 and an output signal of the second multiplexer 241_4, respectively.

The r second logic product gates 241_7 may perform a logic product operation of the test clock signal TCK_SR for the scan output remapper 240 and an output signal of the third multiplexer 241_5, respectively.

FIG. 11 is a view illustrating a secure scan output signal output in a test mode.

Referring to FIGS. 9, 10 and 11, for convenience, it is assumed that the number of cycles of the test clock signal TCK_SR for the scan output remapper 240 is 12, r is 4, the logical value (or bit value) of the linear signals LO is, each cycle, sequentially "0011", "0001", "1000", "0100", "0010", "1001", "1100", "0110", "1011", "0101", "1010" and "1101" and "-" indicates that the first clock signals TCK_11, TCK_12, TCK_13 and TCK 14 and the second clock signals TCK_21, TCK_22, TCK_23 and TCK_24 are gated. It is assumed that "En" indicates that the first clock signals TCK 11, TCK 12, TCK 13 and TCK 14 and the second clock signals TCK_21, TCK_22, TCK 23 and TCK 24 are enabled, have a rising edge or are input to each flip-flop and "SR_A [3:0]" is a first scan output signal OSO1 and "SR_B [3:0]" is a second scan output signal OSO2.

It is assumed that the logical value of the first scan enable signal SE_1 and the logic value of the second scan enable signal SE_2 alternate each other for each cycle. For example, the logical value of the first scan enable signal SE_1 may be a logic low level from a first cycle to a fourth cycle (e.g., from a zeroth cycle count to a third cycle count), and the logic value of the second scan enable signal SE_2 may be a logic high level from the first cycle to the fourth cycle. In this case, the secure scan output signal SSO may be a signal output from four second flip-flops 243_1, 243_2, 243_3, and 243_4. From a fifth cycle to an eighth cycle (e.g., from a fourth cycle count to a seventh cycle count), the logic value of the first scan enable signal SE_1 may be a logic high level, and the logic value of the second scan enable signal SE_2 may be a logic low level. In this case, the secure scan output signal SSO may be a signal output from four first flip-flops 242_1, 242_2, 242_3, and 242_4.

When the first cycle, e.g., the cycle count is 0, the value of the scan output signal PSO is "p0", and only the first clock signals TCK_11 and TCK_12 are enabled. The first flip-flops 242_1 and 242_2 may latch "p0" in response to the rising edge of the first clock signals TCK_13 and TCK 14. When the second cycle, e.g., the cycle count is 1, the value of the scan output signal PSO is "p1", and only the first clock signal TCK_11 is enabled. The first flip-flop 242_1 may latch "p1" in response to the rising edge of the first clock signal TCK_11. When the third cycle, e.g., the cycle count is 2, only the first clock signal TCK_14 is enabled, and the first flip-flop 242_4 may latch "p2" in response to the rising edge of the first clock signal TCK 14. When the cycle count is 3, only the first clock signal TCK_13 may be enabled, and the first flip-flop 242_3 may latch "p3" in response to the rising edge of the first clock signal TCK_13.

When the cycle count is 4 through 7, the secure scan output signal SSO may sequentially output an output value of each flip-flop from the first flip-flop 242_4 corresponding to MSB to the first flip-flop 242_1 corresponding to LSB. When the cycle count is 4, the secure scan output signal SSO may be "p2", when the cycle count is 5, the secure scan output signal SSO may be "p3", when the cycle count is 6, the secure scan output signal SSO may be "p0", and when the cycle count is 7, the secure scan output signal SSO may be "p1".

When the cycle count is 4, only the second clock signal TCK_22 is enabled. The second flip-flop 243_2 may latch "p4" in response to the rising edge of the second clock signal TCK_22. When the cycle count is 5, the second flip-flops 243_1 and 243_4 may latch "p5" in response to the rising edge of the second clock signals TCK 21 and TCK_24. Similarly, when the cycle count is 6, the second flip-flops 243_3 and 243_4 may latch "p6". When the cycle count is 7, the second flip-flops 243_2 and 243_3 may latch "p7".

When the cycle count is 8 through 11, the secure scan output signal SSO having "p6", "p7", "p7", and "p5" sequentially from the second flip-flop 243_4 corresponding to MSB to the second flip-flop 243_1 corresponding to LSB may be output.

FIG. 12 is a view illustrating a secure scan output signal output in a scan dump mode Referring to FIGS. 9, 10, 11, and 12, similarly to FIG. 11, for convenience, it is assumed that the number of cycles of the test clock signal TCK SR is 8, r is 4 and the value of the map selection signal MAP_SEL is {2'b00, 2'b10, 2'b11, 2'b01} (or "00101101"). In this case, {A, B, C, D} indicating the value of the map selection signal MAP_SEL may indicate the priority from a flip-flop corresponding to MSB to a flip-flop corresponding to LSB. For example, a first bit digit (e.g., "A") in {A, B, C, D} may indicate the priority of the flip-flop corresponding to MSB (e.g., the first flip-flop 242_4 and the second flip-flop 243_4), a second bit digit (e.g., "B") in {A, B, C, D} may indicate the priority of a flip-flop corresponding to MSB-1 (e.g., a first flip-flop 242_3 and a second flip flop (243_3), a third bit digit (e.g., "C") in {A, B, C, D} may indicate the priority of a flip-flop corresponding to MSB-2 (e.g., a first flip-flop 242_2 and a second flip-flop 243_2), and a fourth bit digit (e.g., "D") in {A, B, C. D} may indicate the priority of a flip-flop corresponding to LSB (e.g., a first flip-flop 242_1 and a second flip-flop 243_1). Then, the lower the value in parentheses "{ }", the higher the order of latches. For example, in the case of {2'b00, 2'b10, 2'b11, 2'b01}, the latching order may be in the order of a flip-flop corresponding to MSB, a flip flop corresponding to LSB, a flip flop corresponding to MSB-1, and a flip-flop corresponding to MSB_2. In this case, logic values of the encoding signals EO may be repeated as "1000", "0001", "0100", and "0010" for each cycle.

As shown in FIG. 11, it is assumed that the logic value of the first scan enable signal SE_1 and the logic value of the second scan enable signal SE_2 alternate each other for each cycle. For example, when the cycle count is 0, the logic value of the first scan enable signal SE_1 is 0 and the logic value of the second scan enable signal SE_2 is 1.

When the cycle count is 0, the first flip-flop 242_4 may latch "p0". When the cycle count is 1, the first flip-flop 242_1 may latch "p1". When the cycle count is 2, the first flip-flop 242_3 may latch "p2". When the cycle count is 3, the first flip-flop 242_2 may latch "p3". The value of the secure scan output signal SSO may be "0".

When the cycle count is 4, the second flip-flop 243_4 may latch "p4". When the cycle count is 5, the second flip-flop 243_1 may latch "p5". When the cycle count is 6, the second flip-flop 243_3 may latch "p6". When the cycle count is 7, the second flip-flop 243_2 may latch "p7". The value of the secure scan output signal SSO may be sequentially "p0", "p2", "p3", and "p1".

Figure 13:
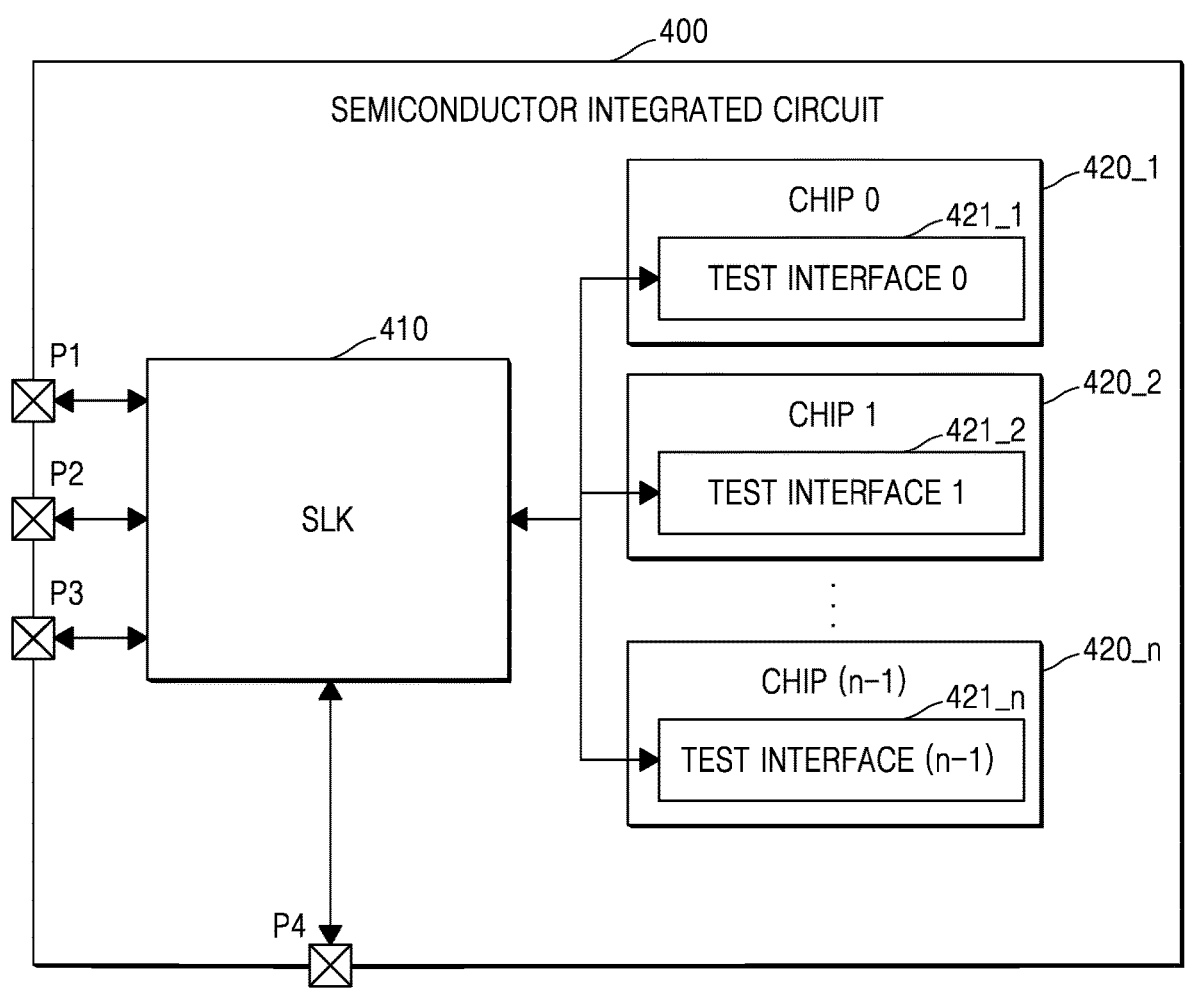
FIG. 13 is a view illustrating a semiconductor integrated circuit according to another example embodiment of the inventive concept.

FIG. 13 is a view illustrating a semiconductor integrated circuit according to another example embodiment of the inventive concept.

Referring to FIG. 13, a semiconductor integrated circuit 400 may include first through fourth pins P1, P2, P3, and P4, as described above with reference to FIG. 1. The semiconductor integrated circuit 400 may include a single lock key circuit 410 and a plurality of chips 420_1, 420_2, . . . , and 420_n. Here, n may be an integer that is greater than or equal to 2.

The single lock key circuit 410 may include the secure scan controller 210, the secure key infusion unit 220, the key comparator 230, the scan output remapper 240, the circuit under test 250, and the OTP 260, which are shown in FIG. 1.

Each of the plurality of chips 420_1, 420_2, . . . , and 420_n may correspond to the circuit under test 250 shown in FIG. 1. The plurality of chips 420_1, 420_2, . . . , and 420_n may include a plurality of test interfaces 421_1, 421_2, . . . , and 421_n. The plurality of test interfaces 421_1, 421_2, . . . , and 421_n may be interfaces for communicating with the single lock key circuit 410 in a test mode or a scan dump mode. According to an example embodiment of the inventive concept, the plurality of chips 420_1, 420_2, . . . , and 420_n may be implemented with a plurality of circuits.

Figure 14:
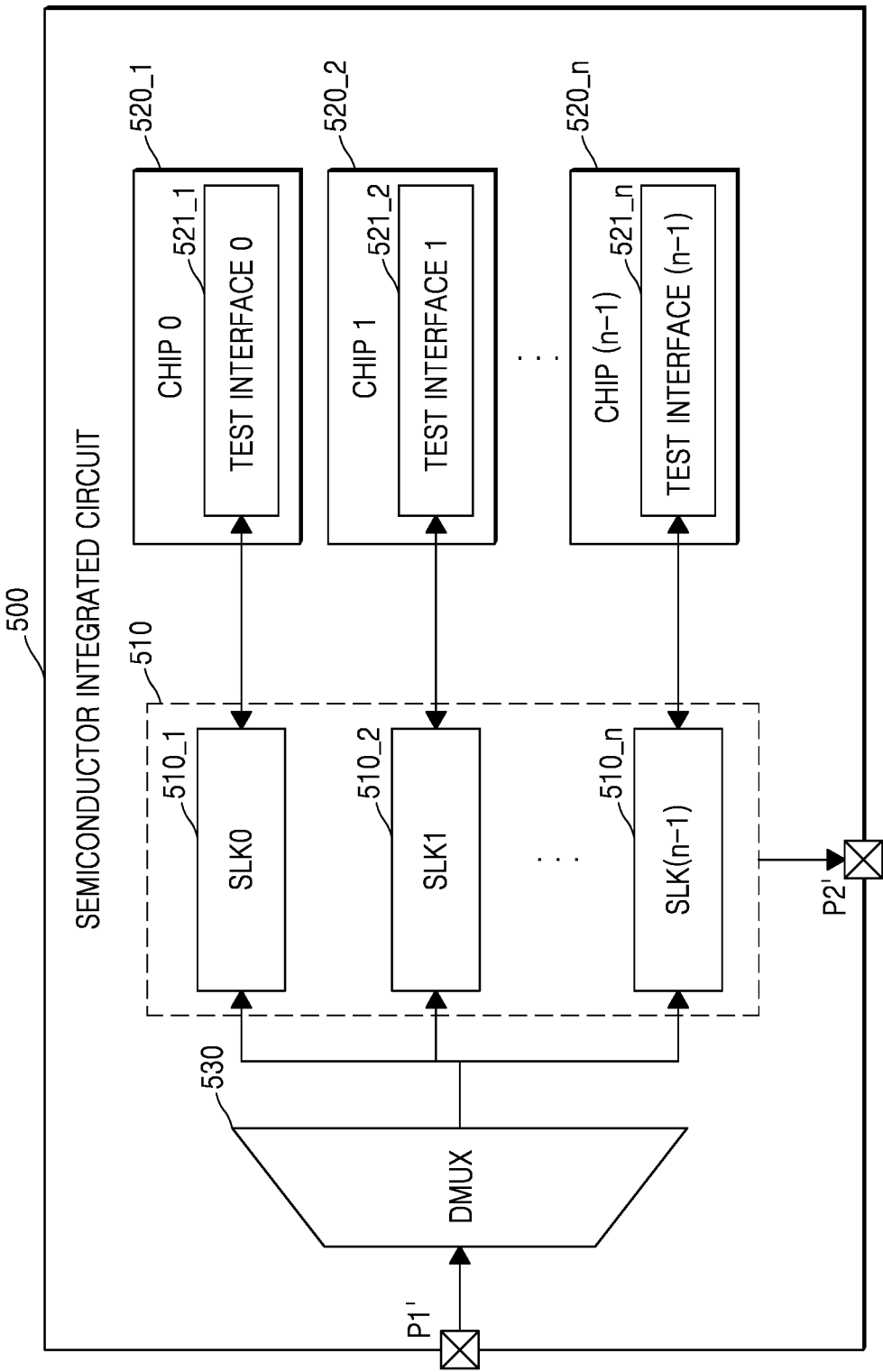
FIG. 14 is a view illustrating a semiconductor integrated circuit according to another example embodiment of the inventive concept.

FIG. 14 is a view illustrating a semiconductor integrated circuit according to another example embodiment of the inventive concept.

Referring to FIG. 14, a semiconductor integrated circuit 500 may include first and second pins P1' and P2'. The semiconductor integrated circuit 500 may receive a test scan input signal TSI or a test clock signal TCK through the first pin P1'. The semiconductor integrated circuit 500 may output the secure scan output signal SSO through the second pin P2'.

The semiconductor integrated circuit 500 may include a single lock key circuit group 510, a plurality of chips 520_1, 520_2, . . . , and 520_n, and a demultiplexer 530.

The single lock key circuit group 510 may include a plurality of single lock key circuits 510_1, 510_2, . . . , and 510_n. Each of the plurality of single lock key circuits 510_1, 510_2, . . . , and 510_n may correspond to the single lock key circuit 410 described above with reference to FIG. 13.

The plurality of chips 520_1, 520_2, . . . , and 520_n may correspond to the plurality of chips 420_1, 420_2, . . . , and 420_n described above with reference to FIG. 13.

In an example embodiment of the inventive concept, a first single lock key circuit 510_1 may communicate with a first test interface 521_1 included in a first chip 520_1. The second single lock key circuit 510_2 may communicate with a second test interface 521_2 included in a second chip 520_2. An n-th single lock key circuit 510_n may communicate with an n-th test interface 521_n included in an n-th chip 520_n.

The demultiplexer 530 may transmit a signal received from the outside to the plurality of single lock key circuits 510_1, 510_2, . . . , and 510_n through the first pin P1'.

Figure 15:
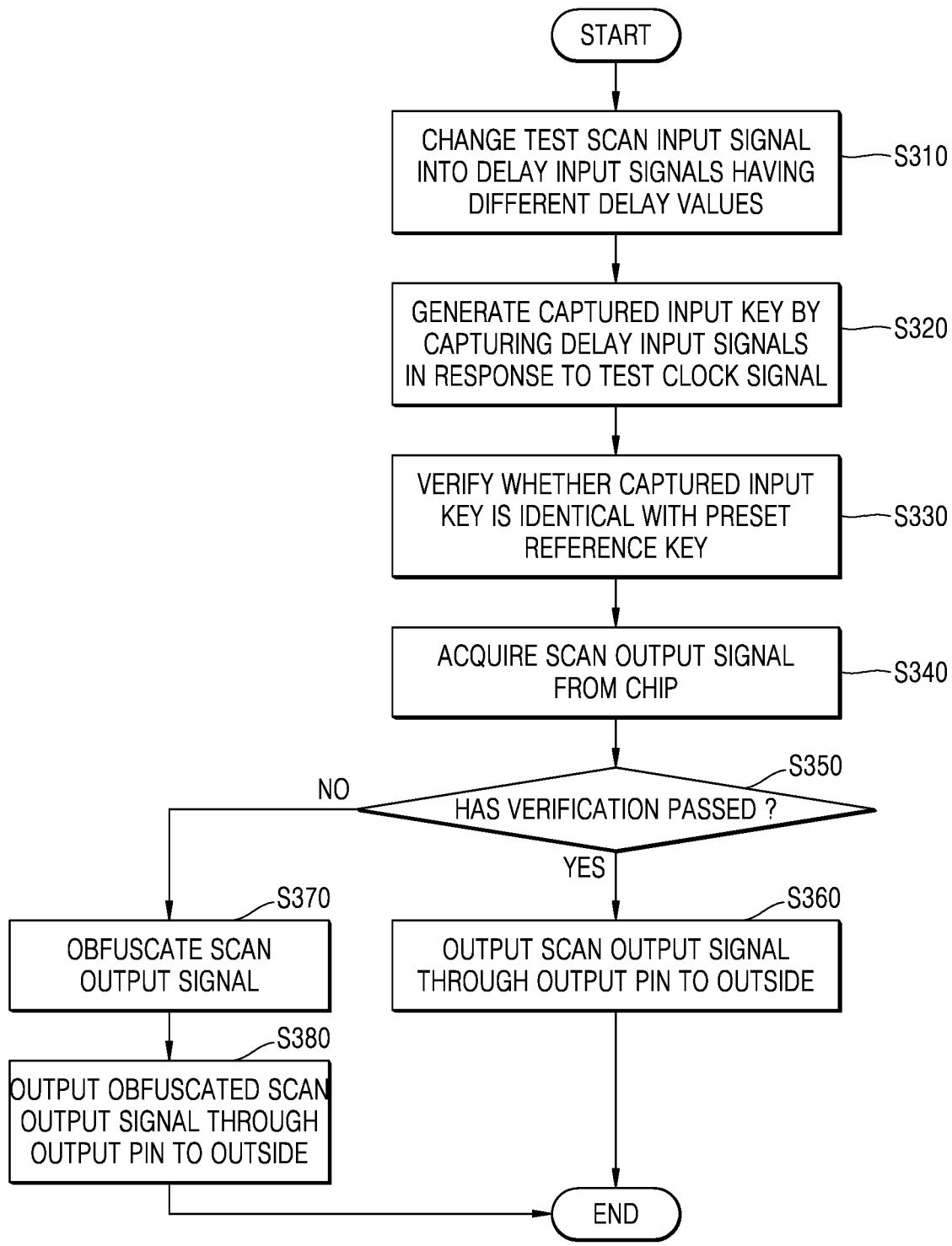
FIG. 15 is a flowchart illustrating a method for testing a semiconductor integrated circuit according to an example embodiment of the inventive concept.

FIG. 15 is a flowchart illustrating a method for testing a semiconductor integrated circuit according to an example embodiment of the inventive concept Referring to FIG. 15, a method for testing a semiconductor integrated circuit may include changing a test scan input signal into a plurality of delay input signals having different delay values (S310), generating an input key signal by capturing the plurality of delay input signals in response to a test clock signal (S320), verifying whether an input key according to the input key signal is identical to a preset reference key (S330), acquiring a scan output signal from a chip (S340), and obfuscating a scan output signal output from a chip to be tested according to a verification result (S350, S360, S370, S380).

In the obfuscating of a scan output signal output from a chip to be tested according to a verification result (S350, S360, S370, S380), the method includes checking whether the verification result is passed (S350), when the verification result is passed (YES in S350), outputting a scan output signal to the outside through an output pin (S360), when the verification result is failed (NO in S350), obfuscating the scan output signal (S370), and outputting the obfuscated scan output signal to the outside through an output pin (S380).

In an example embodiment of the inventive concept, each of a plurality of delay input signals may have a first logic value and a second logic value that is different from the first logic value. In this case, in the generating of the input key signal (S320), logic values of the plurality of delay input signals at a rising edge of a test clock signal may be generated as an input key signal.

In an example embodiment of the inventive concept, in the verifying whether the input key according to the input key signal is identical with the preset reference key (S330), when the input key is identical with the reference key, a signal indicating a pass state may be output. When the input key is different from the reference key, a signal indicating a fail state may be output.

In an example embodiment of the inventive concept, in the outputting of the scan output signal to the outside through the output pin (S360), an unobfuscated scan output signal may be output as a secure scan output signal.

In an example embodiment of the inventive concept, in the outputting of the obfuscated scan output signal to the outside through the output pin (S380), the obfuscated scan output signal may be output as a secure scan output signal.

As described above, a circuit for performing a test may be prevented from being maliciously used so that reliability and security are improved.

In addition, as described above, a test scan input is input to a flip-flop in a parallelized input manner so that the number of cases of input of a secure key can be exponentially increased and thus security can be further improved.

Furthermore, as described above, a test scan input to be input to the flip-flop may be further input in a parallelized input manner instead of adding a flip-flop implemented in a serialized input method, so that manufacturing cost can be reduced and a product can be further integrated.

While the inventive concept has been particularly shown and described with reference to embodiments thereof, it will be understood that various changes in form and details may be made thereto without departing from the spirit and scope of the inventive concept as set forth in the following claims.

What is claimed is:

1. A semiconductor integrated circuit configured to receive a test scan input signal, a test clock signal, and a test mode signal and to output a secure scan output signal, the semiconductor integrated circuit comprising:
   a secure key circuit configured to generate a plurality of delay input signals, each of which having a different delay with respect to the test scan input signal, and to generate an input key signal by capturing a logic level of each of the plurality of delay input signals in response to each rising edge of the test clock signal, such that an input key of the input key signal is varied at each rising edge of the test clock signal;
   a key comparator configured to generate a verification result signal indicating whether the input key is identical with a reference key;
   a chip configured to generate a scan output signal based on the test scan input signal;
   a scan output remapper configured to receive the scan output signal, to output an unobfuscated scan output signal as the secure scan output signal based on the verification result signal indicating that the input key of the input key signal is identical with the reference key, to obfuscate the scan output signal based on the verification result signal indicating that the input key of the input key signal is different from the reference key, and to output the obfuscated scan output signal as the secure scan output signal; and
   a secure scan controller configured to control the secure key circuit, the key comparator, the chip, and the scan output remapper.

2. The semiconductor integrated circuit of claim 1, wherein the secure scan controller is further configured to provide the test scan input signal and the test clock signal to the secure key circuit, and each of the plurality of delay input signals has a first logic value or a second logic value different from the first logic value, and the secure key circuit is further configured to generate logic values of the plurality of delay input signals at a rising edge of the test clock signal as the input key signal.

3. The semiconductor integrated circuit of claim 1, wherein the secure scan controller is further configured to provide a reference key signal and the test clock signal to the key comparator, and the key comparator is further configured to provide a signal indicating a pass state as the verification result signal to the scan output remapper when the input key is identical with the reference key, and provide a signal indicating a fail state as the verification result signal to the scan output remapper when the input key is different from the reference key.

4. The semiconductor integrated circuit of claim 3, wherein the secure scan controller is further configured to count a stage corresponding to the number of times the plurality of delay input signals are captured, when the plurality of delay input signals are captured, and provide a key corresponding to a counted stage among a plurality of previously-stored keys as the reference key to the key comparator.

5. The semiconductor integrated circuit of claim 3, wherein the key comparator is further configured to provide a comparison key signal to the scan output remapper when the input key is different from the reference key, and the scan output remapper is further configured to generate obfuscation information for obfuscating the scan output signal based on the comparison key signal and obfuscate the scan output signal according to the obfuscation information.

6. The semiconductor integrated circuit of claim 1, wherein the scan output remapper is further configured to output the unobfuscated scan output signal as the secure scan output signal when a verification result corresponding to the verification result signal is passed.

7. A semiconductor integrated circuit configured to receive a test scan input signal, a test clock signal, and a test mode signal and to output a secure scan output signal, the semiconductor integrated circuit comprising:
   a secure key circuit comprising N delay circuits and N flip-flops, wherein the N delay circuits are configured to receive the test scan input signal and to output N delay input signals, each of which having a different delay with respect to the test scan input signal and the N flip-flops are configured to latch logic values of the N delay input signals at each rising edge of the test clock signal and to output an input key signal including the latched logic values, such that an input key of the input key signal is varied at each rising edge of the test clock signal;

a key comparator configured to output a verification result signal indicating whether the input key is identical with a reference key;

a chip configured to generate a scan output signal based on the test scan input signal;

a scan output remapper configured to receive the scan output signal, to output an unobfuscated scan output signal as the secure scan output signal based on the verification result signal indicating that the input key of the input key signal is identical with the reference key, to obfuscate the scan output signal based on the verification result signal indicating that the input key of the input key signal is different from the reference key, and to output the obfuscated scan output signal as the secure scan output signal; and a secure scan controller configured to control the secure key circuit, the key comparator, the chip, and the scan output remapper, wherein N is an integer that is greater than or equal to 1.

8. The semiconductor integrated circuit of claim 7, wherein the secure scan controller is further configured to provide the test scan input signal to the N delay circuits and provide the test clock signal to the N flip-flops, and each of the N flip-flops is further configured to latch logic values of the N delay input signals at a rising edge of the test clock signal.

9. The semiconductor integrated circuit of claim 8, wherein at least one of the N delay circuits comprises one or more buffers, and a number of buffers included in an i-th among the N delay circuits is different from a number of buffers included in an j-th among the N delay circuits, wherein i is an integer that is less than or equal to N, and j is different from i and an integer that is less than or equal to N.

10. The semiconductor integrated circuit of claim 9, wherein one delay circuit among the N delay circuits does not include a buffer and is configured to input the test scan input signal to a flip-flop corresponding to the one delay circuit among the N flip-flops.

11. The semiconductor integrated circuit of claim 7, wherein the secure scan controller comprises:

a stage counter configured to output a counted stage by counting a stage corresponding to a number of times logic values of the N delay input signals are latched, and to output a comparison signal for indicating a comparison operation when the stage is counted;

a key selector configured to provide a key selected according to the counted stage among a plurality of previously-stored keys in response to the stage signal as the reference key to the key comparator; and a first logic product gate configured to perform a logic product operation on the comparison signal and the test clock signal and to provide a result of the logic product operation to the key comparator.

12. The semiconductor integrated circuit of claim 11, further comprising:

a one-time programmable memory configured to provide a key selection signal indicating a previously-stored authentication key number to the key selector, wherein the plurality of previously-stored keys comprise stage keys corresponding to a stage and an authentication key set corresponding to the previously-stored authentication key number, and the key selector comprises:

a first multiplexer configured to output a stage key selected according to a stage signal among the stage keys; and a second multiplexer configured to output the selected stage key and a key selected according to the key selection signal among the authentication key set as the reference key.

13. The semiconductor integrated circuit of claim 7, wherein the secure scan controller is further configured to provide the test clock signal to the scan output remapper, and the key comparator is further configured to provide a comparison key signal to the scan output remapper, and the scan output remapper comprises:

a remap controller configured to transmit the scan output signal, to output a first clock signal and a second clock signal based on the test clock signal and the comparison key signal, and to output a first scan enable signal;

an inverter configured to invert the first scan enable signal to output a second scan enable signal;

a first register set configured to latch the scan output signal in response to the first scan enable signal and the first clock signal and to output the latched first scan output signal;

a second register set configured to latch the scan output signal in response to the second scan enable signal and the second clock signal and to output the latched second scan output signal;

a first selector configured to select one among the first scan output signal and the second scan output signal according to the second scan enable signal; and a second selector configured to output one among a scan output signal selected by the first selector and the scan output signal from the remap controller as the secure scan output signal according to the verification result signal.

14. The semiconductor integrated circuit of claim 13, wherein the first register set comprises r first flip-flops serially cascaded, and the first register set comprises r second flip-flops serially cascaded, wherein r is an integer that is greater than or equal to 1.

15. The semiconductor integrated circuit of claim 13, wherein the first selector is a multiplexer, and the second selector is a multiplexer.

* * * * *